United States Patent
Hickman

(10) Patent No.: US 12,330,774 B1
(45) Date of Patent: Jun. 17, 2025

(54) LEVERAGE-REDUCING LANDING GEAR SYSTEM, A CONSTANT ANGLE SUSPENSION LANDING GEAR SYSTEM, OR A COMBINATION OF BOTH SYSTEMS

(71) Applicant: Van's Aircraft, Inc., Aurora, OR (US)

(72) Inventor: Brian Hickman, Canby, OR (US)

(73) Assignee: VAN'S AIRCRAFT, INC., Aurora, OR (US)

( * ) Notice: Subject to any disclaimer, the term of this patent is extended or adjusted under 35 U.S.C. 154(b) by 0 days.

(21) Appl. No.: 18/225,666

(22) Filed: Jul. 24, 2023

Related U.S. Application Data

(60) Provisional application No. 63/391,778, filed on Jul. 24, 2022.

(51) Int. Cl.
| | |
|---|---|
| *B64C 25/58* | (2006.01) |
| *B64C 25/06* | (2006.01) |
| *B64C 25/34* | (2006.01) |
| *B64C 25/62* | (2006.01) |
| *B64C 25/32* | (2006.01) |

(52) U.S. Cl.
CPC .............. *B64C 25/58* (2013.01); *B64C 25/34* (2013.01); *B64C 25/62* (2013.01); *B64C 25/06* (2013.01); *B64C 2025/325* (2013.01)

(58) Field of Classification Search
CPC ......... B64C 25/34; B64C 25/50; B64C 25/58; B64C 25/60; B64C 25/62; B64C 2025/006; B64C 25/06; B60G 2300/16; B60G 2300/18

See application file for complete search history.

(56) References Cited

U.S. PATENT DOCUMENTS

| | | | |
|---|---|---|---|
| 1,685,119 A | | 9/1928 | Carns |
| 2,275,371 A | | 3/1942 | Magrum |
| 2,534,722 A | | 12/1950 | Meiklejohn, Jr. et al. |
| 2,597,265 A | | 5/1952 | Salter |
| 2,869,806 A | * | 1/1959 | Beach ..................... B64C 25/34 244/102 R |
| 3,042,345 A | | 7/1962 | Holland |
| 3,485,465 A | | 12/1969 | Churchill |
| 5,868,352 A | * | 2/1999 | Tsukimori ............... B64C 25/26 244/50 |
| 6,609,682 B2 | | 8/2003 | Rogers |

(Continued)

OTHER PUBLICATIONS

Aircraft Owners and Pilots Association (AOPA); "Van's RV-15 details revealed!"; video transcript; YouTube link: https://www.youtube.com/watch?v=DefmAJG9Wos; video recorded Jul. 24, 2022; video posted Jul. 25, 2022; 9 pages.

(Continued)

*Primary Examiner* — Joshua D Huson
*Assistant Examiner* — Shanna Danielle Glover
(74) *Attorney, Agent, or Firm* — LAW OFFICE OF KAREN DANA OSTER, LLC

(57) ABSTRACT

Improved landing gear systems include a leverage-reducing landing gear system, a constant angle suspension landing gear system, or a combination of both systems. Preferred leverage-reducing landing gear systems include shock absorbers angled upward from their respective primary landing gear legs toward a central vertical longitudinal plane at an angle less than 30 degrees. Preferred constant angle suspension landing gear systems include a four-bar suspension mechanism.

12 Claims, 16 Drawing Sheets

(56) References Cited

U.S. PATENT DOCUMENTS

| | | | |
|---|---|---|---|
| 8,302,905 B2 | 11/2012 | De Ruffray | |
| 8,434,713 B2 | 5/2013 | Bachmeyer et al. | |
| 2011/0031348 A1* | 2/2011 | Thompson | B64C 25/12 |
| | | | 244/102 R |
| 2011/0037345 A1 | 2/2011 | Schultz | |
| 2020/0369381 A1* | 11/2020 | Jackson | B64C 25/40 |

OTHER PUBLICATIONS

Beringer; "Radically different! . . . for Radical Landings"; online product advertisement; at least as early as Jul. 22, 2022; available online at www.beringer-aero.com; 1 page.

Culver; "RV-15" online article; at least as early as Jul. 27, 2022; Experimental Aircraft Association; published online; 3 pages.

Dye; "Tricked-Out Tailwheel"; web article; Jan. 19, 2018; published online at http://ironflight.com; 12 pages.

Experimental Aircraft Channel; "Big Tires! Vans Aircraft—Epic Reveal Day 2"; video transcript; YouTube link: https://www.youtube.com/watch?v=0v_fAQgvU-w; posted Jul. 12, 2022; 3 pages.

Experimental Aircraft Channel; "RV-15 Vans Aircraft Epic Reveal! Today!"; video transcript; YouTube link: https://www.youtube.com/watch?v=z16eGH83Cml; posted Jul. 9, 2022; 9 pages.

Flyer; "RV-15 Ed Interviews Rian Johnson"; video transcript; YouTube link: https://www.youtube.com/watch?v=eeQi6kAf9a8; video recorded Jul. 25, 2022; posted Jul. 25, 2022; 9 pages.

Miscellaneous Sources; "Photos and Downloads of possible tailwheel prior art gathered from the internet: Acme Aero Suspensions Stinger, DH2C Beaver (1), DH2C Beaver (2), Just Aircraft SuperSTOL Tailwheel, Piper PA18 Tailwheel Spring, T3 Tailwheel Suspension Zlin ShockCub Tailwheel"; at least as early as Jul. 22, 2022; 7 pages.

Miscellaneous Sources; "Photos and Downloads of possible main gear prior art gathered from the internet: Beringer Shock Wheel, Helio Courier, Helio Courier, Pilatus Porter, Piper PA-18, Stinson 108, Stinson 108, TK1 Racing Cabane Vee, Wilga PZL-104" at least as early as Jul. 22, 2022; 9 pages.

Miscellaneous Sources; "Photos and Downloads of possible prior art—vehicle suspensions—gathered from the internet: F1 Car 2, F1 Car 3, Lamborghini Aventador Rear Suspension"; at least as early as Jul. 22, 2022; 3 pages.

Pierce; "Interesting article on tailwheel shimmy"; online forum thread; at least as early as Jul. 6, 2006; backcountrypilot.org; 5 pages.

Schlitter, Randy; "Randy Schlitter's Sketches"; Facebook posts; Jul. 11, 2022; Randy Schlitter's personal Facebook page; 2 pages.

Supercub Forum; "Thread: Wide tailwheel steering problem"; online forum thread; at least as early as Jan. 2022; SuperCub.Org; 9 pages.

Van's Aircraft; "RV-15 Engineering Prototype (on 26's)—Van's Employee Reveal Party (plus an invisible feature")"; video description; YouTube link: https://www.youtube.com/watch?v=-FLjPoxsk7Y; company video footage recorded Jul. 11, 2022; posted online Jul. 11, 2022; 1 page.

Van's Aircraft; "RV-15 Test Prototype Aircraft Reveal"; video identification; YouTube link: https://www.youtube.com/watch?v=5sHK-B230sY; compilation of company video footage recorded from Jun. 25, 2022 to Jul. 8, 2022; posted online Jul. 9, 2022; 1 page.

* cited by examiner

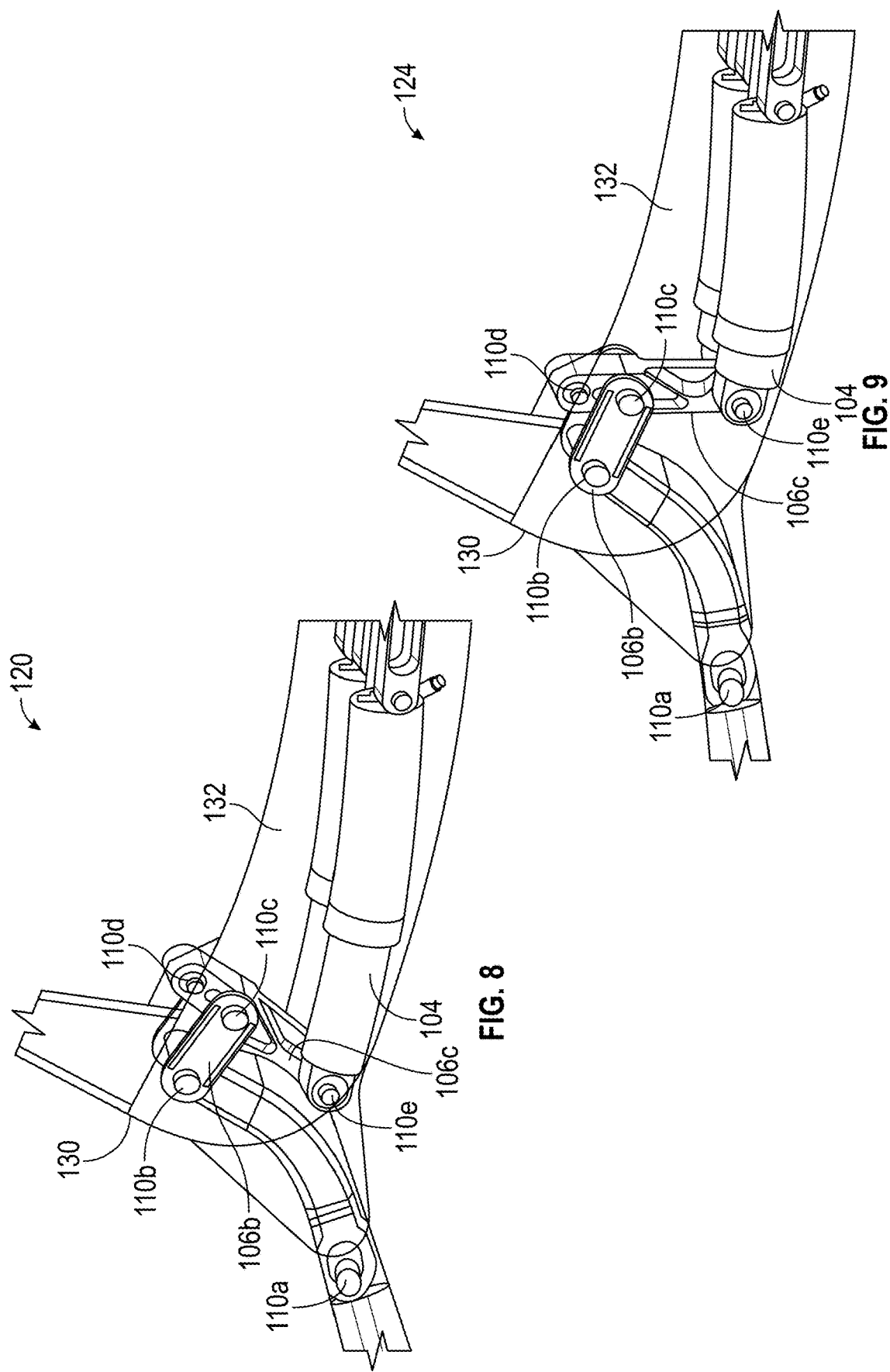

LEVERAGE-REDUCING LANDING GEAR SYSTEM, A CONSTANT ANGLE SUSPENSION LANDING GEAR SYSTEM, OR A COMBINATION OF BOTH SYSTEMS

The present application is an application claiming the benefit of U.S. Provisional Patent Application No. 63/391,778, filed Jul. 24, 2022. The present application is based on and claims priority from this application, the disclosure of which is hereby expressly incorporated herein by reference in its entirety.

COPYRIGHT NOTICE

A portion of the disclosure of this patent document contains material that is subject to copyright protection. The copyright owner has no objection to the facsimile reproduction of the patent disclosure as it appears in the Patent and Trademark Office patent files or records, but otherwise reserves all copyright rights whatsoever.

TECHNICAL FIELD

The present disclosure describes methods, apparatuses, and/or systems related to improvements for aircraft landing gear. One improvement generally relates to the technical field of landing gear having a leverage-reducing system for low profile energy absorption. Another improvement generally relates to the technical field of landing gear having a constant angle suspension mechanism using constant caster angle energy absorption.

BACKGROUND

The earliest history of aircrafts dates back to Clément Ader, the Wright brothers, and their successors building a small aircraft with the goal of flying. In the 1950s, as building small aircrafts became popular with enthusiasts, companies began to provide aircraft or plane "kits" (which could include as little as the bare plans and as much as all the components so that only assembly is required). While some people choose to use production small aircraft, today, astronauts, airline pilots, military jet pilots, machinists, welders, professional people, and others who desire to fly continue the tradition of building small aircraft from scratch and/or from kits.

The materials and features of kit-built aircraft have continuously improved. Early kits were for wood-and-cloth and steel tube-and-cloth design. Later kits provided for composite construction. Richard VanGrunsven took metal construction in kit planes to a new level in his RV series. Kits that are more sophisticated now include components such as autopilots and advanced navigation instruments. New and innovative designs incorporated into some modern kits allow the kit planes to outperform certified production aircraft in their class. Van's Aircraft, the applicant hereof, was founded by the aforementioned Richard VanGrunsven and began offering aircraft kits in 1973. Throughout its history, Van's Aircraft has been innovating and improving all aspects of its kits.

The purpose of landing gear is to support the aircraft and to absorb the impact energy from the landing of an aircraft. The landing gear is attached directly or indirectly to the primary structural members (also referred to as the "airframe") of the aircraft. Most landing gear has at least one landing gear leg (also referred to using phrases such as "strut," "landing strut," or "flexing gear assembly"). Most landing gear also has tires (wheels) to facilitate operation to and from hard surfaces, such as airport runways. Alternative landing gear may replace the tires with alternative structure for specific purposes (e.g. skis for landing in snow). Although there are many types of landing gear (e.g. tandem landing gear and tricycle-type landing gear), a common type of landing gear is arranged with the "main gear" (also referred to using phrases such as "primary gear," "primary landing gear," "primary landing gear legs," "main landing gear," "main landing gear legs," "front gear," or "front landing gear legs") forward of the center of gravity and the "tail gear" (also referred to using phrases such as "secondary gear," "secondary landing gear," "tail landing gear," "rear gear," "castered wheel," or "tail wheel") behind the center of gravity. An example of conventional landing gear would include a pair of wheeled primary (main) gear landing gear legs and a wheeled caster-type secondary (tail) gear (also referred to using phrases such as a "secondary gear" or "tail wheel").

Landing gear can be classified as fixed or retractable. Fixed landing gear (also referred to as "externally-mounted landing gear") is attached to the airframe and remains exposed to the slipstream as the aircraft is flown. As the speed of an aircraft increases, so does aerodynamic drag. Retractable landing gear retracts into the body of the aircraft and, thereby, reduces or eliminates aerodynamic drag. Aerodynamic drag is generally undesirable, but it becomes more problematic as speeds increase.

Landing gear can be used to control the landing forces (also referred to using phrases such as "shock energy," "impact forces," or "impact energy") on an aircraft during landing. One way this has been accomplished is by using curved spring steel landing gear legs with pneumatic tires. In some cases, bungee cords were positioned between the rigid airframe structure and the flexing gear assembly to safely take up the impact forces and return them to the airframe. Another way this has been accomplished is by using shock absorbers (e.g. springs or self-contained hydraulic units) that convert the impact forces into heat energy. The shock absorbers may be attached to or integral with the landing gear legs ("shock struts"). FIG. 1 shows shock absorbers 60 attached to the landing gear legs 62. The landing gear legs 62 are at least partially positioned within the body of the airplane (specifically, the fuselage). The landing gear legs 62 pivot (an arrow indicates the pivot and a portion of the landing gear leg 62 in a rotated position is shown in dashed lines) and push on their respective shock absorbers 60 with a very small amount of travel. Within the fuselage there is not much room to travel and the combined landing gear leg and shock absorber occupies a lot of height.

FIGS. 11 and 12 show exemplary wheeled caster-type tail gear 80 (referred to using phrases such as "tail gear," "secondary gear," and "tail wheel") that is used in known aircraft. The tail gear 80 of FIG. 11 is shown as a castered wheel attached to the aircraft by a stack of bent steel 82. The tail gear 80' of FIG. 12 is shown as a castered wheel attached to a Piper PA-18 Super Cub aircraft by a stack of bent steel 82'. Springs 84 are shown as being attached at one end to the bottom of the aircraft and at the other end to the tail gear 80'. Springs (not shown in FIG. 12) may be attached at one end to the bottom of the Piper PA-18 Super Cub (on either side of the stack of bent steel 82') and at the other end to the tail gear 80' (for example, using the shown apertures 84').

One known problem with tail gear (tail wheels) is tail wheel shimmying. (This shimmying is similar to the side-to-side shaking or wobbling of wheels of a supermarket grocery cart.) In one informal observation, about 50% of tail wheel airplanes landing on a grooved runway (the grooving was believed to exacerbate tail wheel shimmying) experienced tail wheel shimmy. Tail wheel shimmying can be described not only as shaking side-to-side, but also rotating around the pivot axis un-commanded. Tail wheel shimmying creates big spikes in loads, annoys the passengers, annoys the pilot, and causes a certain degree of loss of control over the tail wheel.

There are many suggested solutions for tail wheel shimmying that have various degrees of success. One solution is correcting the caster angle. For an airplane having a spring that is bolted (with a bolt that passes through the spring leaves) at the front to the airframe with the spring resting on a pad (several inches behind the point through which the through bolt passes), correcting the caster angle can be accomplished by adding a shim between the pad and the spring to increase the steering angle. Alternatively, correcting the caster angle can be accomplished by re-bending the spring (increasing the arch of the spring), though this can only correct the position for a single deflection of the spring. This creates a range of incorrect positions that will occur in use of the tail gear during large to moderate impacts.

SUMMARY

Described herein are improvements for aircraft landing gear. One improvement for aircraft landing gear is a system that uses a primary leverage-reducing system for low profile energy absorption. Another improvement for aircraft landing gear is a secondary landing gear mechanism with constant caster angle energy absorption.

Described herein are improved landing gear systems including: a leverage-reducing landing gear system and a constant angle suspension landing gear system. These improved landing gear systems are used in conjunction with aircraft having: a front, a rear, a top, a bottom, and a central vertical longitudinal plane perpendicular to horizontal ground and extending from the front to the rear. The aircraft also has an airframe and landing gear. The aircraft also has a center of gravity. Preferred improved landing gear systems may include only a leverage-reducing landing gear system, only a constant angle suspension landing gear system, or both a leverage-reducing landing gear system and a constant angle suspension landing gear system.

A preferred leverage-reducing landing gear system (that may be an energy-absorbing, damped landing gear system) preferably includes landing gear including a first primary landing gear leg and a second primary landing gear leg, the landing gear legs positioned on opposite sides of the central vertical longitudinal plane. At least one first shock absorber is functionally connected to the first primary landing gear leg. The at least one second shock absorber is functionally connected to the second primary landing gear leg. The shock absorbers are angled upward from their respective primary landing gear legs toward the central vertical longitudinal plane at an angle less than 30 degrees. In some preferred leverage-reducing landing gear systems, the angle is less than 20 degrees. These relatively small angles allow for compact packaging of the leverage-reducing landing gear system to at least reduce drag caused by externally-mounted landing gear while preserving interior cabin volume.

In some preferred leverage-reducing landing gear systems, the first and second primary landing gear legs are positioned between the center of gravity and the front of the aircraft.

In some preferred leverage-reducing landing gear systems, the at least one first shock absorber is functionally connected to the first primary landing gear leg via a first system of segments and connectors, and the at least one second shock absorber is functionally connected to the second primary landing gear leg via a system of segments and connectors.

In some preferred leverage-reducing landing gear systems, the connections between the first primary landing gear leg and the at least one first shock absorber are as follows: the first primary landing gear leg is pivotably connected to the airframe by a first leg pivot point and rotatably connected to a first leg-to-arm linkage via a first leg-linkage rotator; the first leg-to-arm linkage is rotatably connected to a first leverage-reducing arm via a first arm-linkage rotator; and the first leverage-reducing arm is pivotably connected to the airframe via a first arm pivot point and rotatably connected to the at least one first shock absorber via a first arm-shock rotator. In these preferred leverage-reducing landing gear systems, the connections between the second primary landing gear leg and the at least one second shock absorber are as follows: the second primary landing gear leg is pivotably connected to the airframe by a second leg pivot point and rotatably connected to a second leg-to-arm linkage via a second leg-linkage rotator; the second leg-to-arm linkage is rotatably connected to a second leverage-reducing arm via a second arm-linkage rotator; and the second leverage-reducing arm is pivotably connected to the airframe via a second arm pivot point and rotatably connected to the at least one second shock absorber via a second arm-shock rotator.

In some preferred leverage-reducing landing gear systems, the airframe defines a fuselage and one end of each of the first and second primary landing gear legs are positioned within the fuselage.

In some preferred leverage-reducing landing gear systems, the landing gear including includes tires.

A preferred constant angle suspension landing gear system includes a castered tire positioned to align with the central vertical longitudinal plane. At least one secondary shock absorber may be mounted between the airframe and the castered tire. At least one constant angle suspension mechanism is mounted between the airframe and the castered tire, the at least one constant angle suspension mechanism being more toward the front of the aircraft than the castered tire. The castered tire may be positioned between the center of gravity and the rear of the aircraft.

In some preferred constant angle suspension landing gear systems, the at least one constant angle suspension mechanism is a four-bar suspension mechanism. A preferred four-bar suspension mechanism may include: at least one upper tail wheel control arm; at least one lower tail wheel control arm; at least one fuselage mount; and at least one caster mount. The at least one fuselage mount preferably rotatably mounts the at least one upper tail wheel control arm and the at least one lower tail wheel control arm to the airframe. The at least one caster mount preferably rotatably mounts the at least one upper tail wheel control arm and the at least one lower tail wheel control arm to the at least one fuselage mount.

Some preferred constant angle suspension landing gear systems further include a fuselage mount, a shock absorber mount, and a caster mount. The fuselage mount rotatably mounts the constant angle suspension mechanism to the airframe. The shock absorber mount mounts the at least one secondary shock absorber to the aircraft. The caster mount forms a junction between the castered tire, the at least one secondary shock absorber, and the constant angle suspension mechanism.

Objectives, features, combinations, and advantages described and implied herein will be more readily understood upon consideration of the following detailed description of the invention, taken in conjunction with the accompanying drawings.

DESCRIPTION OF THE DRAWINGS

The accompanying drawings illustrate various exemplary aircraft landing gear improvements, components of various exemplary aircraft landing gear improvements, and/or provide teachings by which the various exemplary aircraft landing gear improvements are more readily understood.

FIG. 8 is a close up detailed view of the segments, connectors, and shock absorber of the preferred exemplary leverage-reducing system in the uncompressed (flight) position.

FIG. 9 is a close up detailed view of the segments, connectors, and shock absorber of the preferred exemplary leverage-reducing system in the compressed 50% position.

Figure 1:
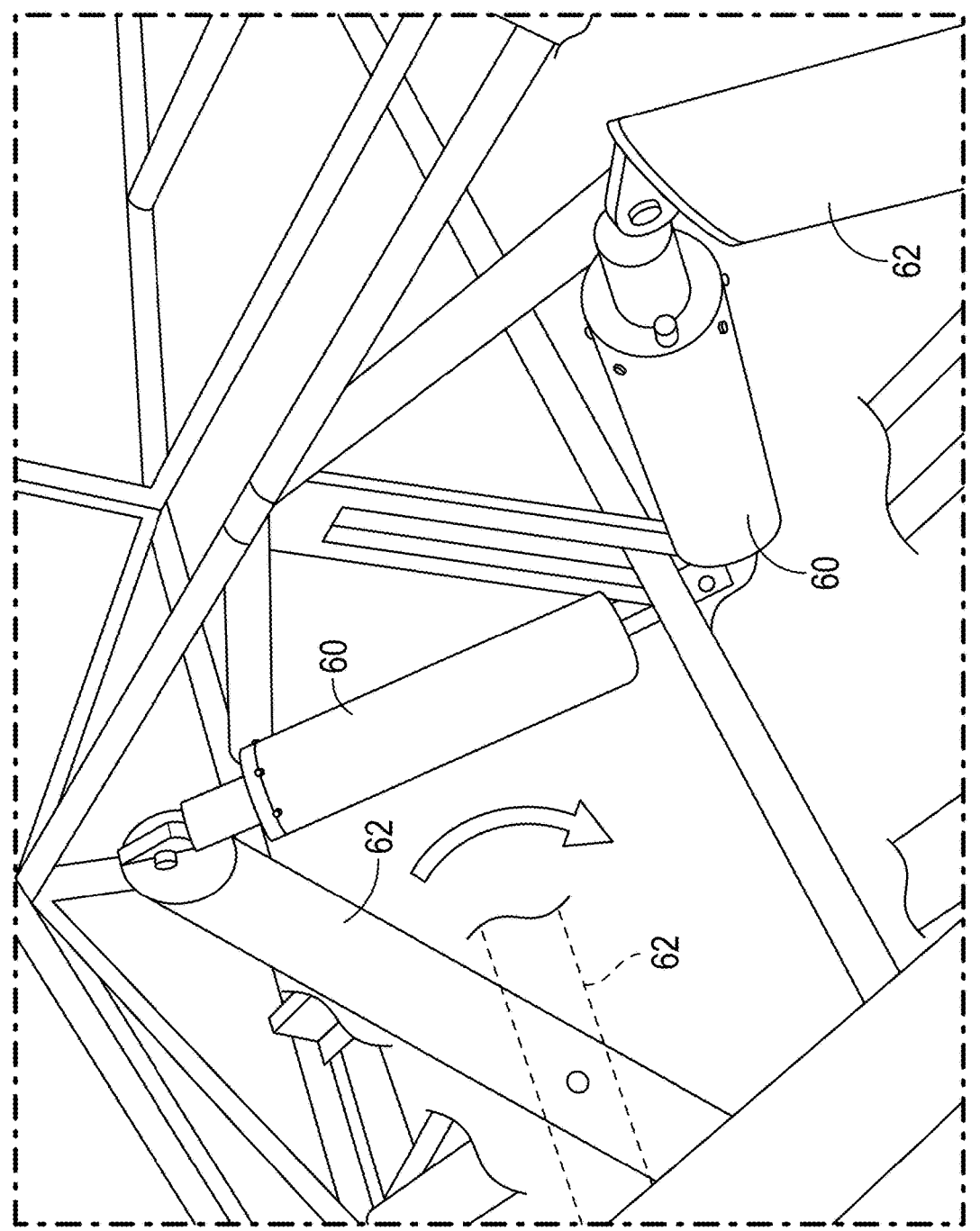
FIG. 1 is a perspective view of prior art shock absorbers attached to the landing gear legs.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION

Described herein are improvements for aircraft landing gear. FIGS. 2-10 show a first improvement for aircraft landing gear (shown as the primary or main landing gear) that is a leverage-reducing system 100 for low profile energy absorption. FIGS. 13-17 show a second improvement for aircraft landing gear that is a constant angle suspension mechanism 200 (also referred to using phrases such as "four-bar linkage suspension mechanism," "four-bar suspension linkage," and "four-bar suspension linkage secondary landing gear mechanism") for secondary landing gear (shown as a tail wheel), the constant angle suspension mechanism 200 providing constant caster angle energy absorption 200. These improvements can be used during landing and ground operations to reduce pilot workload and the loads/accelerations imposed on the airframe. One preferred exemplary advantage of the leverage-reducing system 100 improvement is that it provides damped shock absorption without external mechanisms or imposing on the interior volume of the aircraft.

Figure 18:
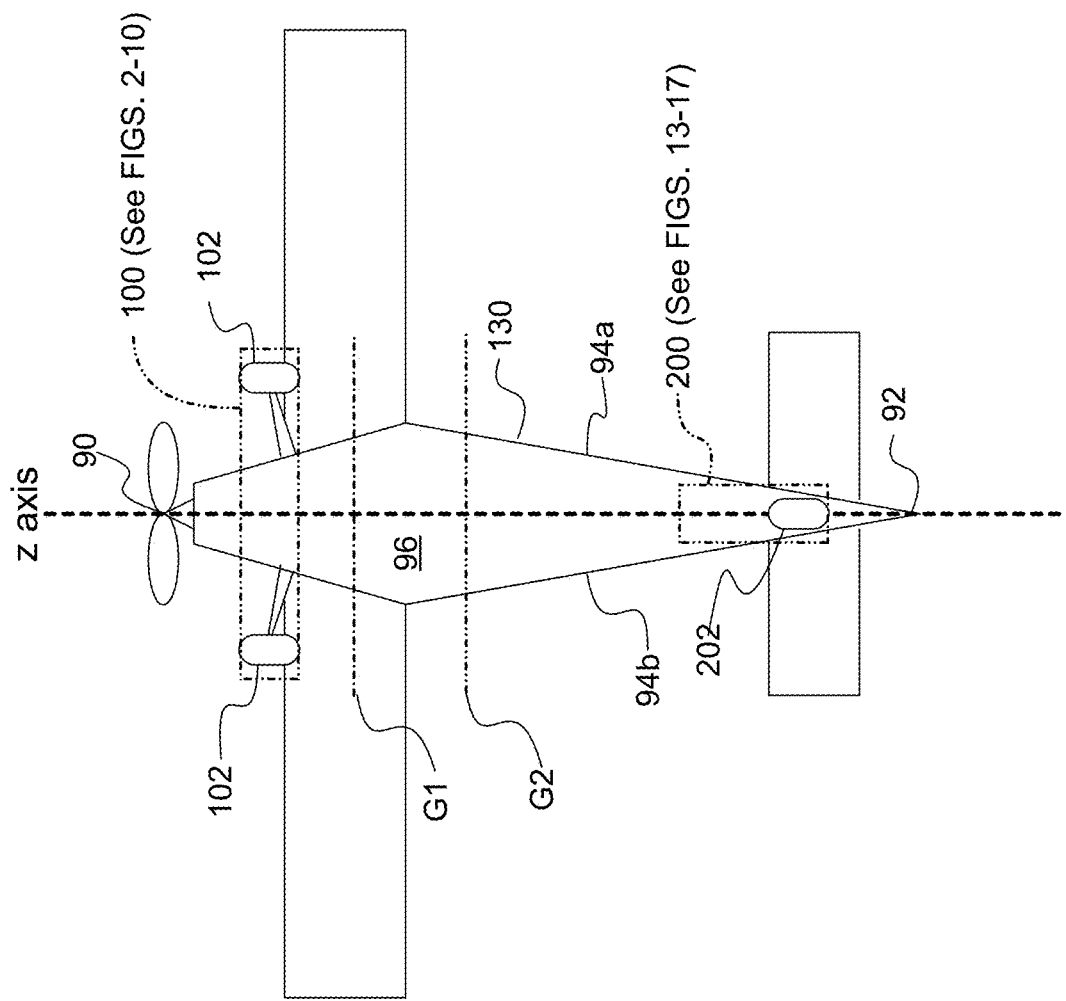
FIG. 18 is a bottom schematic view of an aircraft.

For purposes of discussion, FIG. 18 shows exemplary simplified landing gear arranged with the tires 102 of the "primary gear" (also referred to as "primary landing gear legs") forward of the center of gravity (toward the front 90 of the aircraft) and the tires 202 of the "secondary gear" (also referred to as the "tail wheel") behind the center of gravity (toward the rear 92 of the aircraft). FIG. 18 shows exemplary centers of gravity G1 and G2 representing the fact that the center of gravity will be dependent on the specific aircraft. It should be noted that the "primary gear" could be behind the center of gravity (toward the rear 92 of the aircraft) and the tires 202 of the "secondary gear" could be in front of the center of gravity (toward the front 90 of the aircraft). The primary gear and secondary gear are always on opposite sides of the center of gravity. Generally, the primary gear is closer to the center of gravity than the secondary gear.

Exemplary aircraft landing gear improvements may be better understood with reference to the drawings, but these aircraft landing gear improvements are not intended to be of a limiting nature. Unless specified otherwise, the shown shapes and relative dimensions are preferred, but are not meant to be limiting unless specifically claimed, in which case they may limit the scope of that particular claim.

Before describing the aircraft landing gear improvements and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide basic parameters for interpreting terms and phrases used herein.

The term "aircraft" and the phrase "small aircraft" include
    amateur built aircraft, after-market modified aircraft,
    kit-built aircraft (including plan-only kits, all-component kits, and kits providing more than plan-only kits and less than all-component kits), and small production aircraft.

The phrase "landing gear" includes structure used to absorb the impact energy from the landing of an aircraft. Although the components of the landing gear discussed herein can take many formats and/or be used with or be adapted to be used with many different types of landing gear, for discussion purposes, the landing gear will be described as having wheeled "primary gear" (also referred to as "main gear," "front gear," or "landing gear legs") forward of the center of gravity and wheeled "secondary gear" (also referred to as "tail gear," "rear gear" or "caster-type tail gear") behind the center of gravity. The wheeled primary gear includes at least one landing gear leg 106a (and, in most cases, two landing gear legs 106a) with at least one tire thereon. Although shown and described primarily in terms of wheeled landing gear (tires), alternative landing gear may replace the tires with alternative structure for specific purposes (e.g. skis for landing in snow).

The term "associated" is defined to mean integral or original, retrofitted, attached, connected (including functionally connected), positioned near, and/or accessible by. For example, the aircraft landing gear improvements may be associated with an aircraft if they are sold as components for amateur built aircraft and after-market modified aircraft, included with kits for kit-built aircraft, or integral with small production aircraft. Another example is that the components of the aircraft landing gear improvements are associated with the airframe of the aircraft if they are attached directly or indirectly to the airframe.

It should be noted that relative terms are meant to help in the understanding of the technology and are not meant to limit the scope of the invention. For example, the terms "primary" and "secondary" are meant to designate the primary gear from the secondary gear, but are not meant to designate importance or quantity. Similarly, unless specifically stated otherwise, the terms "first" and "second" are meant solely for purposes of designation and not for order or limitation. For example, the first improvement for aircraft landing gear (the leverage-reducing system 100 for low profile energy absorption for the primary gear) has no order relationship with the second improvement for aircraft landing gear (e.g. the secondary or tail wheel landing gear mechanism with constant caster angle energy absorption).

It should be noted that some terms used in this specification are meant to be relative. For example, the term "front" is meant to be relative to the term "rear," and the term "side" is meant to describe a "face" or "view" that connects the "front" and the "rear." Similarly, the term "top" is meant to be relative to the term "bottom." In the description of the aircraft shown in FIG. 18 the front 90 is opposite the rear 92, the sides 94a and 94b connect the front 90 to the rear 92, and the bottom 96 is opposite the top (not shown). Rotation of the system or component that would change the designation might change the terminology, but not the concept.

Terms such as "may," "might," "can," and "could" are used to indicate alternatives and optional features and only should be construed as a limitation if specifically included in the claims. Claims not including a specific limitation should not be construed to include that limitation.

Unless specifically stated otherwise, the term "exemplary" is meant to indicate an example, representation, and/or illustration of a type. It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

Figure 2:
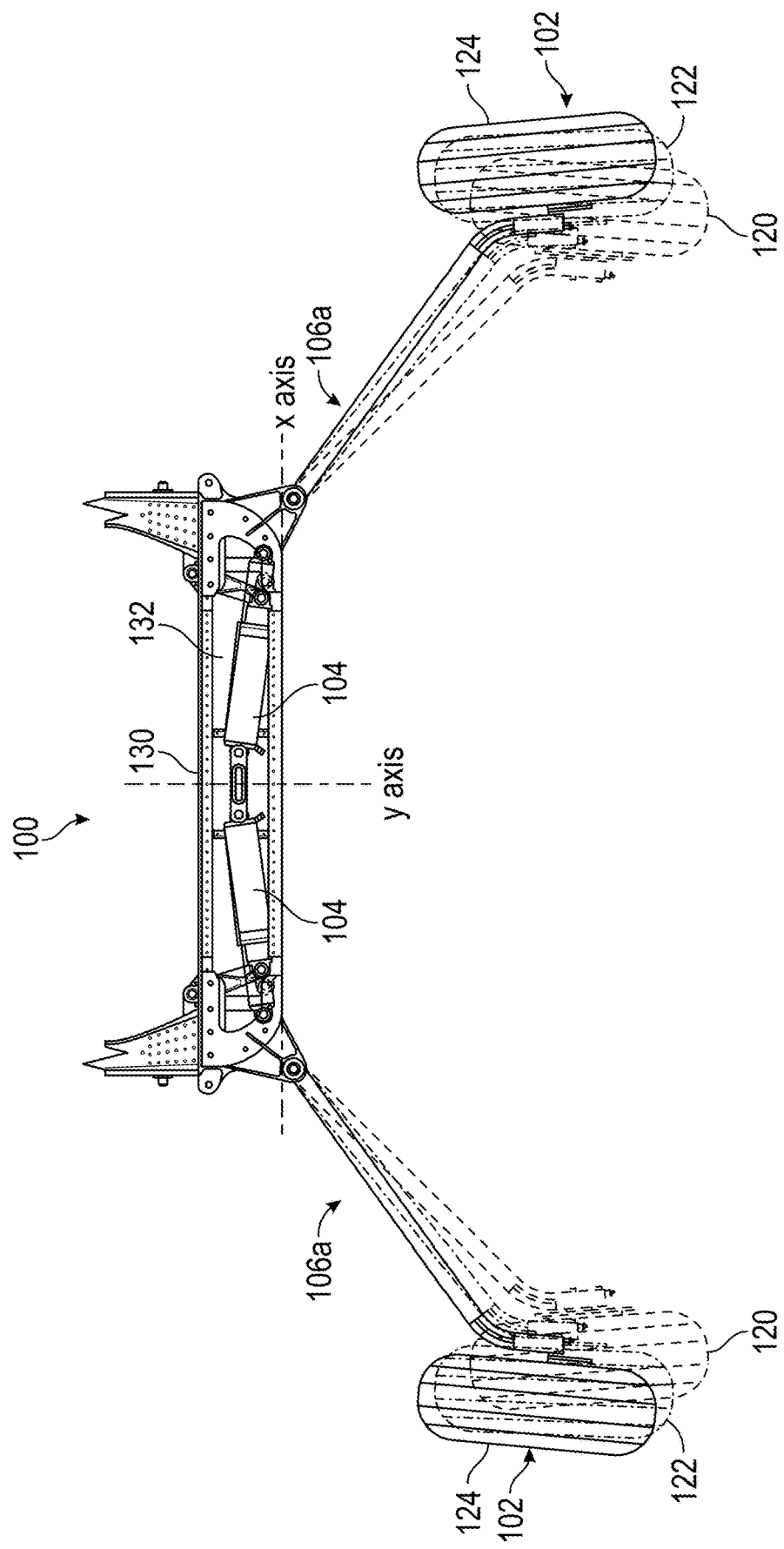
FIG. 2 is a sectional front view of the primary landing gear legs of a preferred exemplary leverage-reducing system, the primary landing gear legs shown in three overlapping positions: uncompressed, compressed 25%, and compressed 50%.
Figure 3:
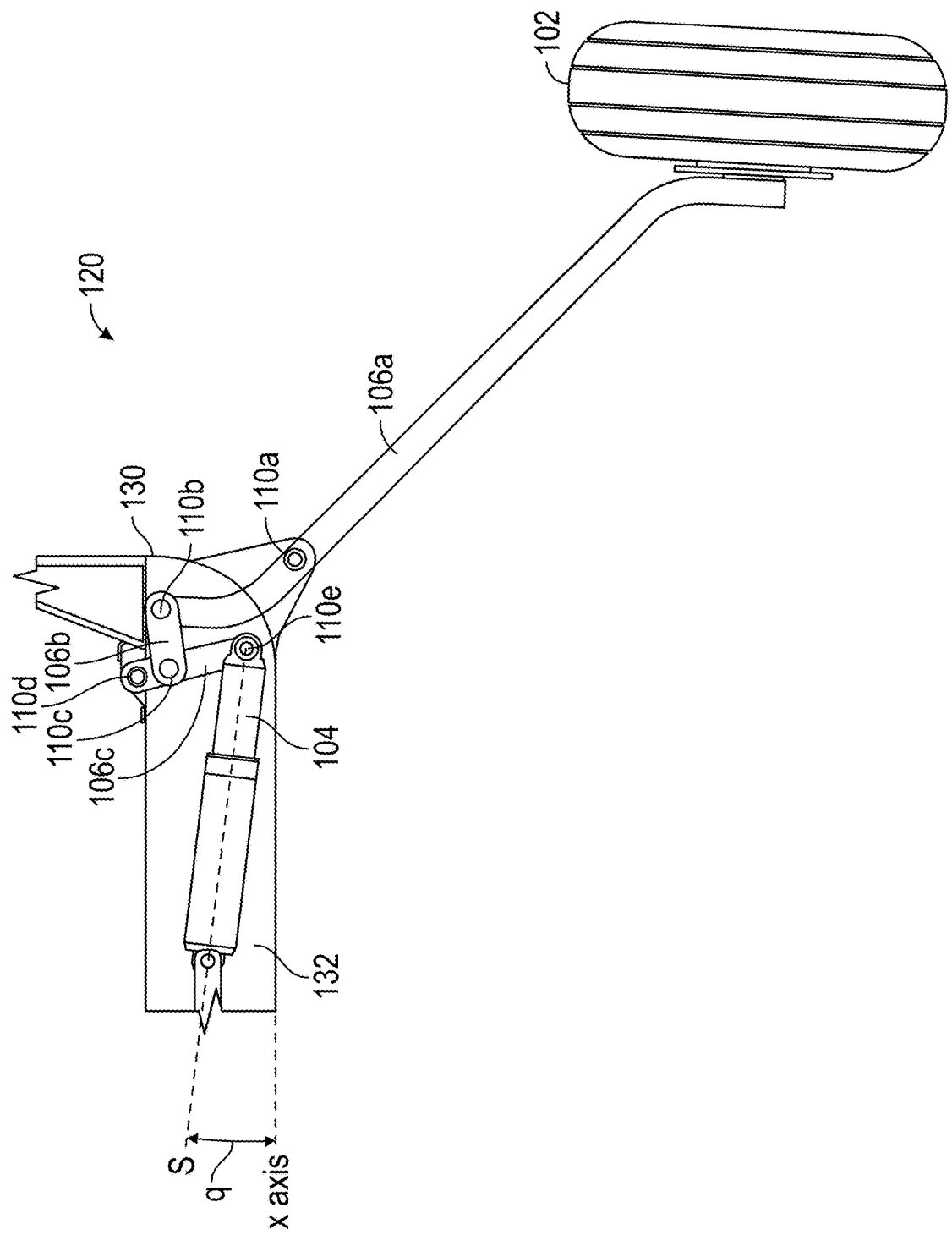
FIG. 3 is a schematic view of the internal components of the preferred exemplary leverage-reducing system associated with one landing gear leg in the uncompressed (flight) position.
Figure 4:
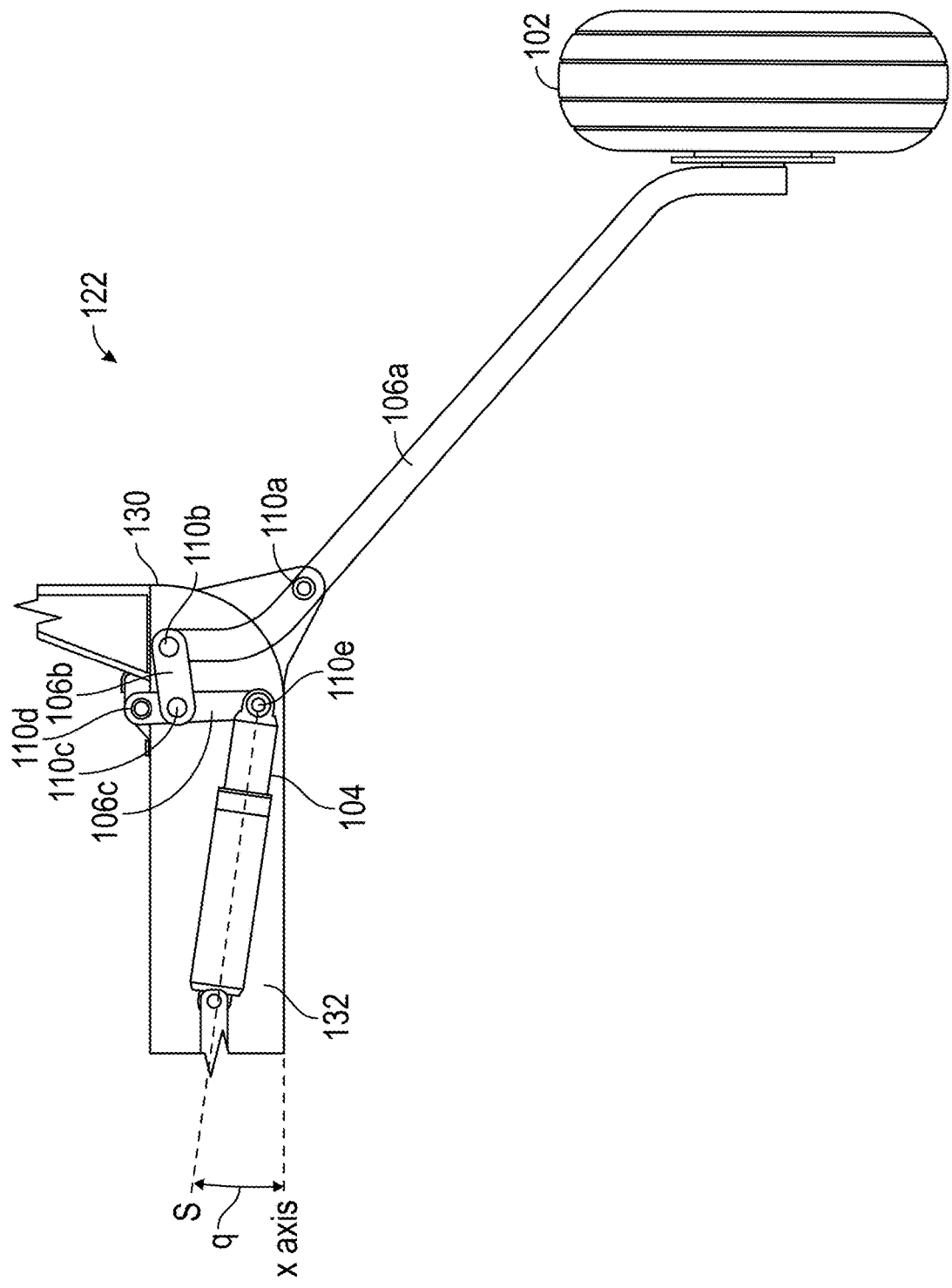
FIG. 4 is a schematic view of the internal components of the preferred exemplary leverage-reducing system associated with one landing gear leg compressed 25%.
Figure 5:
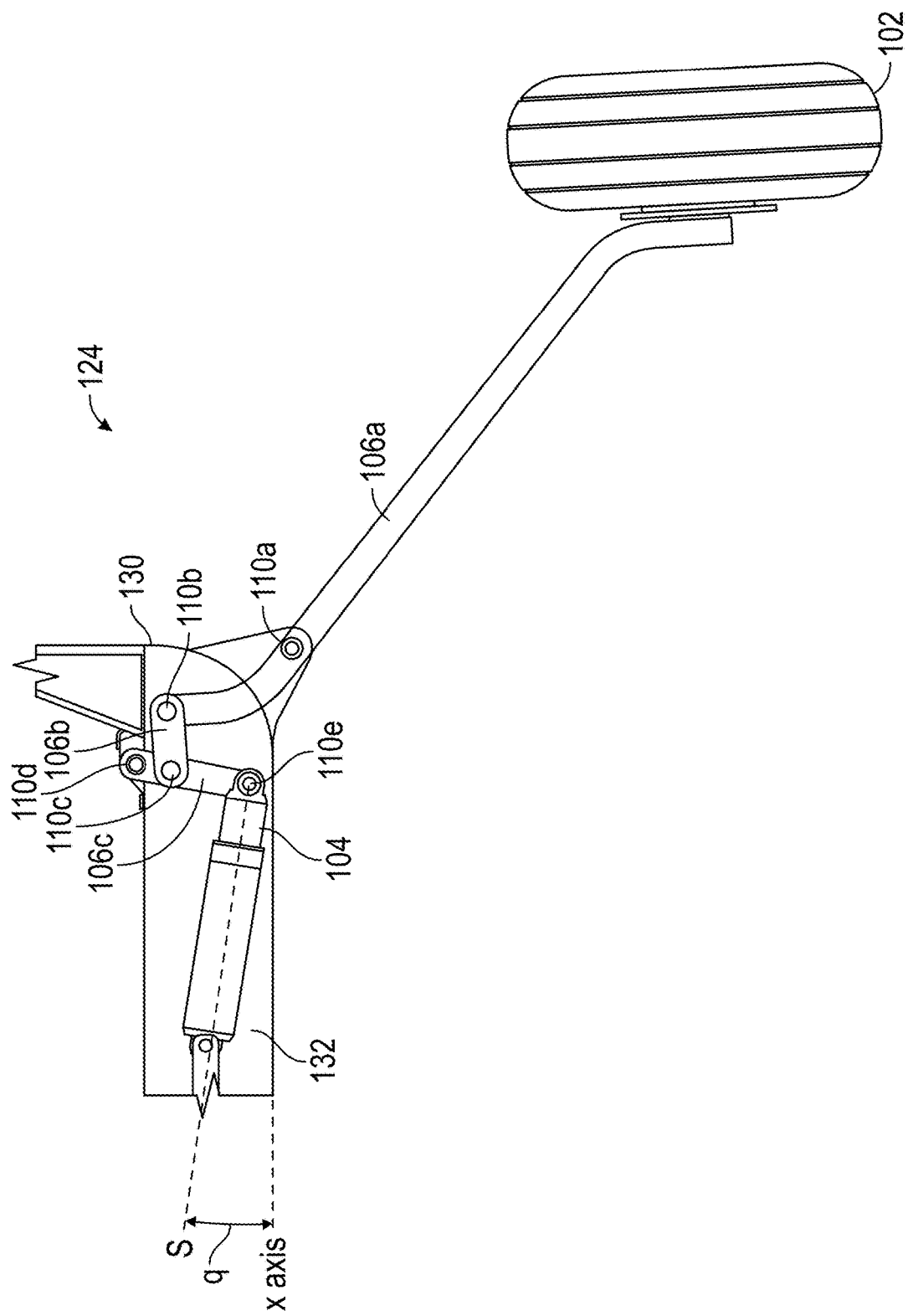
FIG. 5 is a schematic view of the internal components of the preferred exemplary leverage-reducing system associated with one landing gear leg compressed 50%.

Leverage-Reducing System for Low Profile Energy Absorption:

As shown in FIGS. 2-10, aircraft landing gear may be improved by the inclusion of a leverage-reducing system 100 for energy absorption. The leverage-reducing system 100 allows for compact packaging of an energy-absorbing, damped landing gear system that reduces or eliminates the drag caused by externally-mounted landing gear while preserving interior cabin volume. Reducing or eliminating drag becomes more important as the speed of the aircraft increases. The leverage-reducing system 100 accomplishes this, for example, by allowing the shock absorbers 104 (that would generally include at least one first shock absorber 104 and at least one second shock absorber 104) to be positioned significantly flatter (0-30 degrees, and preferably less than 20 degrees) than the steep angle (at least 40 degrees, and usually more) of known aircraft (e.g. FIG. 1). The angles (degrees) are relative to the ground (or a horizontal plane parallel to the plane defined by the x axis (FIG. 2) and the y axis (FIG. 18)). 0 degrees would be flat/horizontal and 90 degrees would be vertical. FIGS. 3-5 show angle q as the angle between the shock absorber central s axis and the x axis (horizontal). Angle q is shown in these figures as approximately 10 degrees.

The leverage-reducing system 100 is preferably a mechanical system that uses a system of segments and connectors (some of which are pinned joints), to direct and alter the landing forces to the shock absorbers 104. From the outside of the aircraft, the landing gear (including, for example, the tires 102 and the primary landing gear legs 106a) still appears to rotate in a traditional manner. Internally, however, there are changes as to how the landing gear leg(s) 106a (strut(s)) attach(es) to the shock absorber(s) 104.

Figure 7:
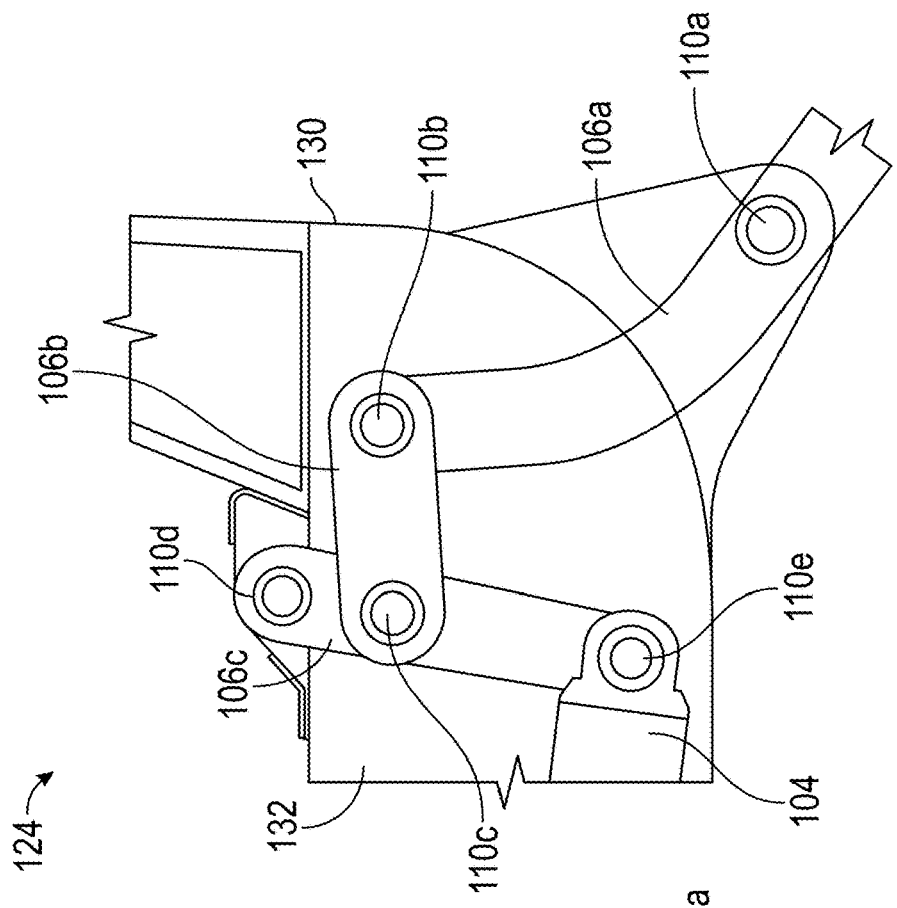
FIG. 7 is a close up detailed view of the segments and connectors of the preferred exemplary leverage-reducing system in the compressed 50% position.
Figure 10:
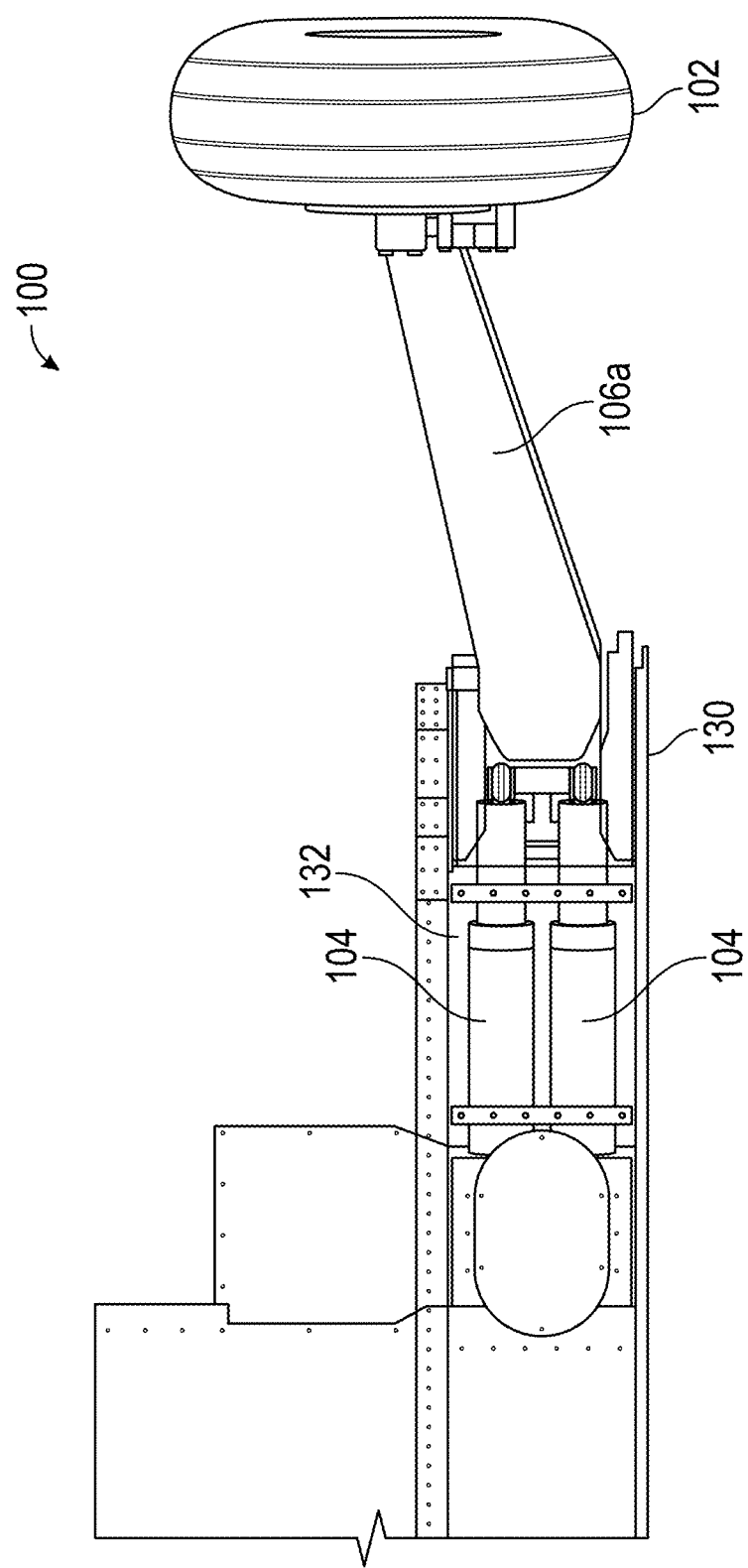
FIG. 10 is a bottom view of one side of the preferred exemplary leverage-reducing system.

FIG. 2 shows the primary landing gear legs 106a (also referred to as "first and second landing gear legs," "struts" or "flexing gear assemblies") in three overlapping positions: uncompressed 0% 120 (the flight position, shown in more detail in FIGS. 3, 6, and 8), compressed 25% 122 (shown in more detail in FIG. 4), and compressed 50% 124 (shown in more detail in FIGS. 5, 7, and 9). It also shows one end of each of the first and second landing gear legs 106a positioned within the fuselage 132 (defined by the airframe 130) attached by a series of internal components to respective shock absorbers 104. FIG. 10 is a bottom view of the shock absorbers (shown as a pair of shock absorbers) associated with one landing gear leg 106a of the primary landing gear. Although some of the figures show only the components associated with one landing gear leg 106a, there are corresponding components associated with the other landing gear leg 106a that are symmetrical with the shown components about the longitudinal center (the central vertical longitudinal plane defined by the y axis (FIG. 2) and the z axis (FIG. 18)) of the aircraft. The shown components and the symmetrical twin can be considered to be first and second components (e.g. first landing gear leg and second landing gear leg).

Figure 6:
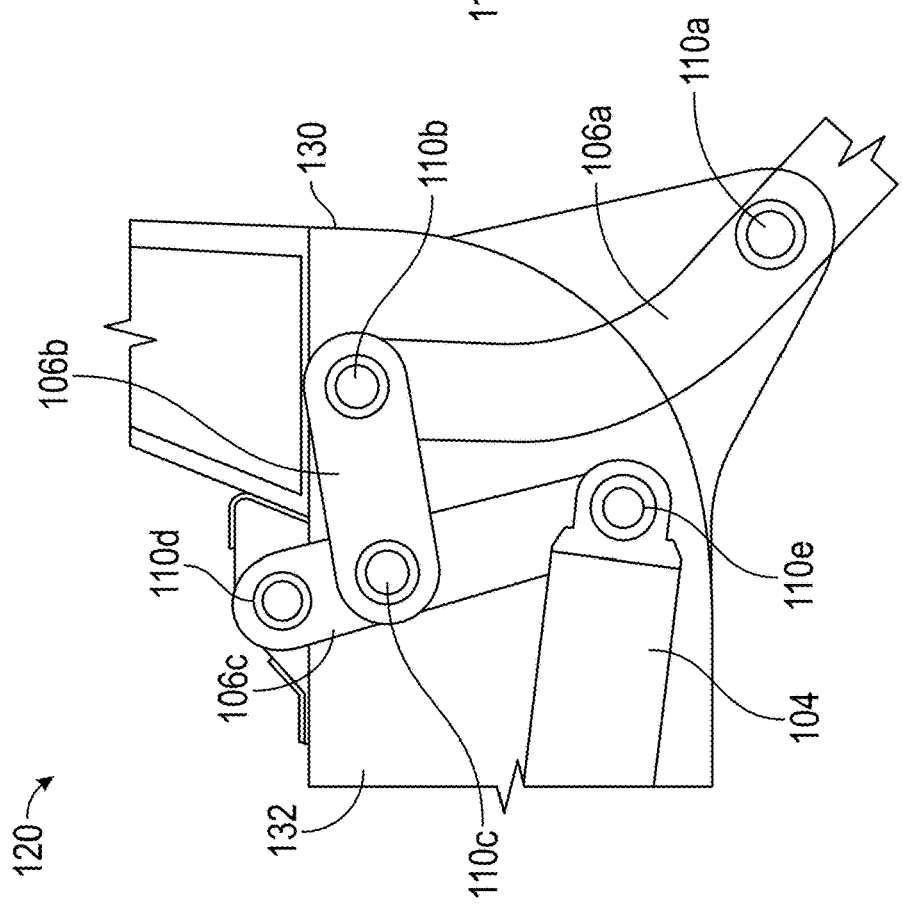
FIG. 6 is a close up detailed view of the segments and connectors of the preferred exemplary leverage-reducing system in the uncompressed (flight) position.

FIGS. 3, 6, and 8 show progressively more detail about the internal components (the components preferably at least partially within the airframe 130 and, preferably, at least partially within the fuselage 132) of the leverage-reducing system associated with one landing gear leg 106a in the flight position. FIG. 3 shows the internal components of the leverage-reducing system 100 associated with one landing gear leg 106a in the flight position. FIG. 6 shows a close up of the segments and connectors of the leverage-reducing system 100 in the flight position. FIG. 8 shows a close up of the segments, connectors, and shock absorber(s) 104 of the leverage-reducing system 100 in the flight position.

FIG. 4 shows the internal components of the leverage-reducing system 100 associated with one landing gear leg 106a compressed 25%.

FIGS. 5, 7, and 9 show progressively more detail about the internal components of the leverage-reducing system 100 associated with one landing gear leg 106a compressed 50%. FIG. 5 shows the internal components of the leverage-reducing system 100 associated with one landing gear leg 106a compressed 50%. FIG. 7 shows a close up of the segments and connectors of the leverage-reducing system 100 compressed 50%. FIG. 9 shows a close up of the segments, connectors, and shock absorber(s) 104 of the leverage-reducing system 100 compressed 50%.

FIGS. 2-10 show the segments (a landing gear leg 106a, a leg-to-arm linkage 106b, and a leverage-reducing arm 106c) and connectors (a leg pivot point 110a, a leg-linkage rotator 110b, an arm-linkage rotator 110c, an arm pivot point 110d, and an arm-shock rotator 110e) of the leverage-reducing system 100. Between the tire 102 and the shock absorber 104, there are three main segments: the landing gear leg 106a, the linkage 106b (leg-to-arm linkage 106b), and the arm 106c (leverage-reducing arm 106c). The connectors can be divided into two types: pivots and rotators. The pivots are attached (fixed) to the aircraft (e.g. the airframe 130) so that the segment(s) rotate(s), but the pivot(s) remain(s) fixed in place relative to the aircraft. The rotators allow rotation between components, but are not attached to the airframe 130 and, therefore, can move (travel) in relation to the aircraft (e.g. the airframe 130).

As shown in FIGS. 2-10, starting from the tire 102, there is a landing gear leg 106a (segment), a leg pivot point 110a (connector), a leg-linkage rotator 110b (connector), a leg-to-arm linkage 106b (segment), an arm-linkage rotator 110c (connector), a leverage-reducing arm 106c (segment), an arm pivot point 110d (connector), an arm-shock rotator 110e (connector), and the shock absorber 104.

The landing gear leg 106a (segment) transfers, multiplies, and redirects the force applied to the tire 102 into the top of the leg 106a, allowing the leg 106a to rotate about the leg pivot point 110a.

The leg-to-arm linkage 106b (linkage 106b) transfers the force from the gear leg 106a into the leverage-reducing arm 106c. The linkage 106b has two rotators (the leg-linkage rotator 110b and the arm-linkage rotator 110c), the rotators are shown as being associated with each end (although it does not have to be an absolute end) of the linkage 106b. Because the rotators 110b, 110d are not attached to the airframe 130, the linkage 106b can move (travel) within the aircraft. This movement can be seen by comparing FIG. 6 with FIG. 7 and by comparing FIG. 8 with FIG. 9.

The leverage-reducing arm 106c (arm 106c) transfers and reduces the force from the linkage 106b into the shock absorber 104. This allows for more "stroke" [() (shock absorption capacity) of the shock absorber 104. Put another way, the "stroke" is the distance between uncompressed and fully compressed, so "more stroke" would equate to greater shock absorption capacity. The arm 106c has the arm pivot point 110d associated with a first end (shown as the top end) and the arm-shock rotator 110e associated with a second end (shown as the bottom end). Between the arm pivot point 110d and the arm-shock rotator 110e is the arm-linkage rotator 110c. As the landing gear leg 106a pivots about the leg pivot point 110a, the linkage 106b pushes or pulls the arm 106c causing the arm 106c to pivot about the arm pivot point 110d. This movement can be seen by comparing FIG. 6 with FIG. 7 and by comparing FIG. 8 with FIG. 9.

The shock absorber(s) 104 (shown as two shock absorbers 104 in FIG. 10) have an extension cycle and a compression cycle. In the extension cycle, the working cylinder extends from the main body of the shock absorber 104. FIG. 8 shows the working cylinder extending from the main body of the shock absorber 104. In the compression cycle, the working cylinder compresses into the main body of the shock absorber 104. FIG. 9 shows the working cylinder compressed into the main body of the shock absorber 104. As the arm 106c pivots about the arm pivot point 110d, its other end (the end with the arm-shock rotator 110e) swings about an arc. The energy transferred from the arm 106c is absorbed by and controlled by the shock absorber 104 as it extends and compresses. This movement can be seen by comparing FIG. 6 with FIG. 7 and by comparing FIG. 8 with FIG. 9.

The segments and connectors of the leverage-reducing system 100 are instrumental in the efficient placement of the shock absorbers 104. Because the shock absorbers 104 are positioned significantly flatter (0-30 degrees, and preferably less than 20 degrees) than the steeper position of traditional shock absorbers (FIG. 1), they can be positioned in an opposing configuration where the shock absorbers 104 are substantially "back to back" (with an optional center mount therebetween as shown in FIG. 2). This allows the forces acting on the outside ends (toward the sides of the aircraft) of the shock absorbers 104 to be transferred toward the center (along the central vertical longitudinal plane) of the aircraft. Because the shock absorbers 104 are substantially "back to back," the opposing forces are substantially cancelled out. Put another way, the shock absorbers' energy absorption creates a force that must be reacted, the opposing placement of the opposite sides shock absorbers cancels out (relieves) a substantial portion of the force that would otherwise be transferred into the aircraft's frame. The reduction of forces acting on the aircraft's frame allows for a lightweight surrounding structure. This results in greater structural efficiency.

The leverage-reducing system 100 for energy absorption described herein has significant advantages over known aircraft (e.g. a Stinson 108) that had shock absorbers directly attached to the landing gear legs inside the body of the aircraft. Known aircraft has a leverage ratio of about 5:1 where the tires move about 5 inches for every 1 inch of shock absorber stroke (the distance the working cylinder moves). This is problematic because of the limited shock absorption that stroke provides. Using the leverage-reducing system 100 described herein significantly improves the leverage ratio to about 1.5:1 where the tires 102 move about 1.5 inches for every 1 inch of shock absorber stroke (the distance the working cylinder moves).

It should be noted that the leverage ratio can be optimized for particular aircraft and/or aircraft landing gear. For example, the length of the leverage-reducing arm 106c (arm) can be increased to increase shock absorber stroke or decreased to reduce shock absorber stroke. Another example is that moving the arm-linkage rotator 110c toward the arm pivot point 110d will reduce the suspension travel at the wheel while moving the arm-linkage rotator 110c away from the arm pivot point 110d increases suspension travel at the wheel. The leverage-reducing system 100 can be provided with sets of linkages and/or arms of different lengths (or adjustable linkages and/or arms) or linkages and/or arms having extra apertures thereon to allow the user to optimize the leverage-reducing system 100 for particular aircraft and/or aircraft landing gear, to suit different shock absorbers 104, or accommodate desired tire travel.

Figure 11:
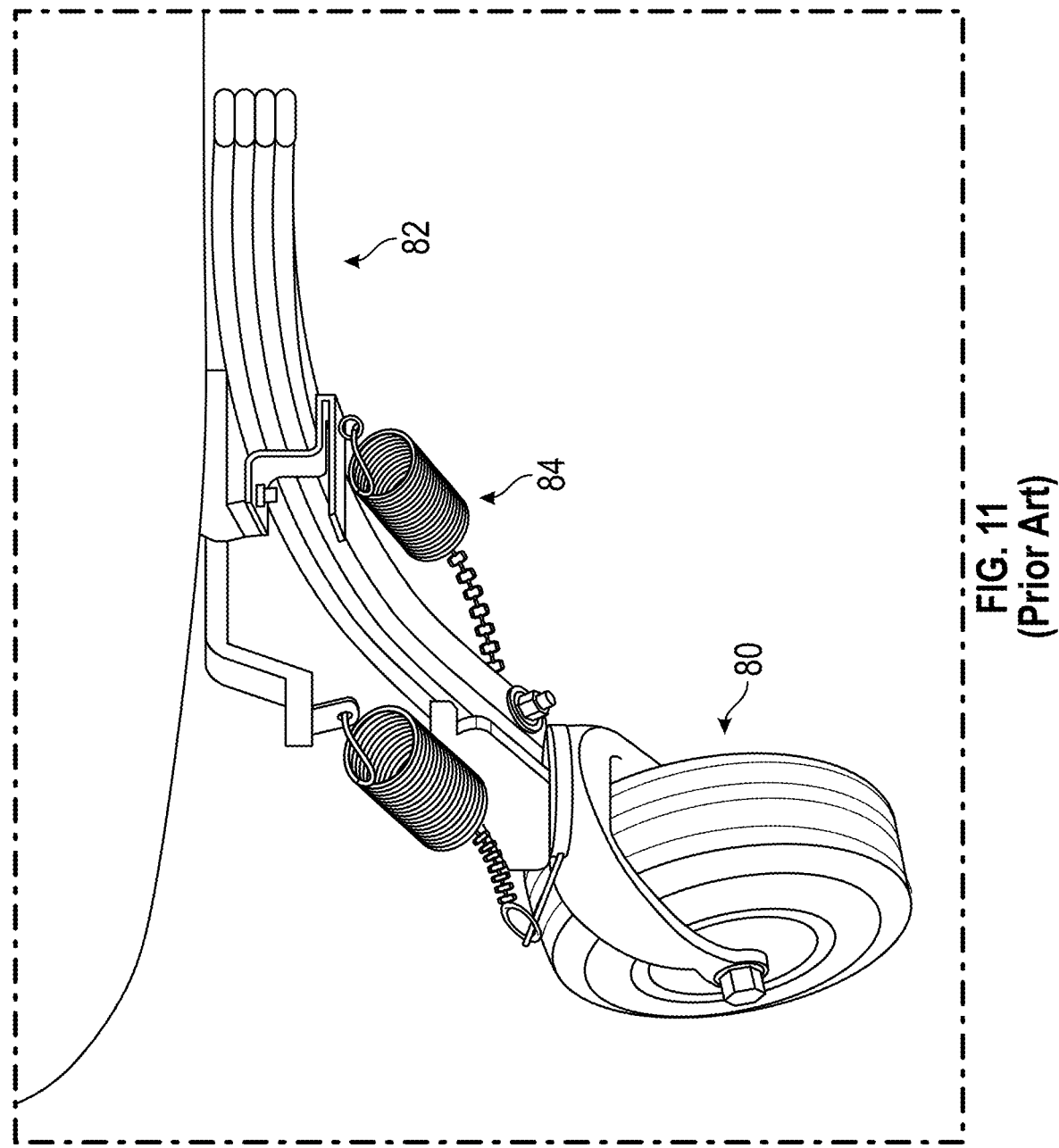
FIG. 11 is a perspective view of first exemplary prior art wheeled caster-type tail gear attached to the aircraft by a stack of bent steel, the castered wheel attached to the aircraft by a stack of bent steel.
Figure 12:
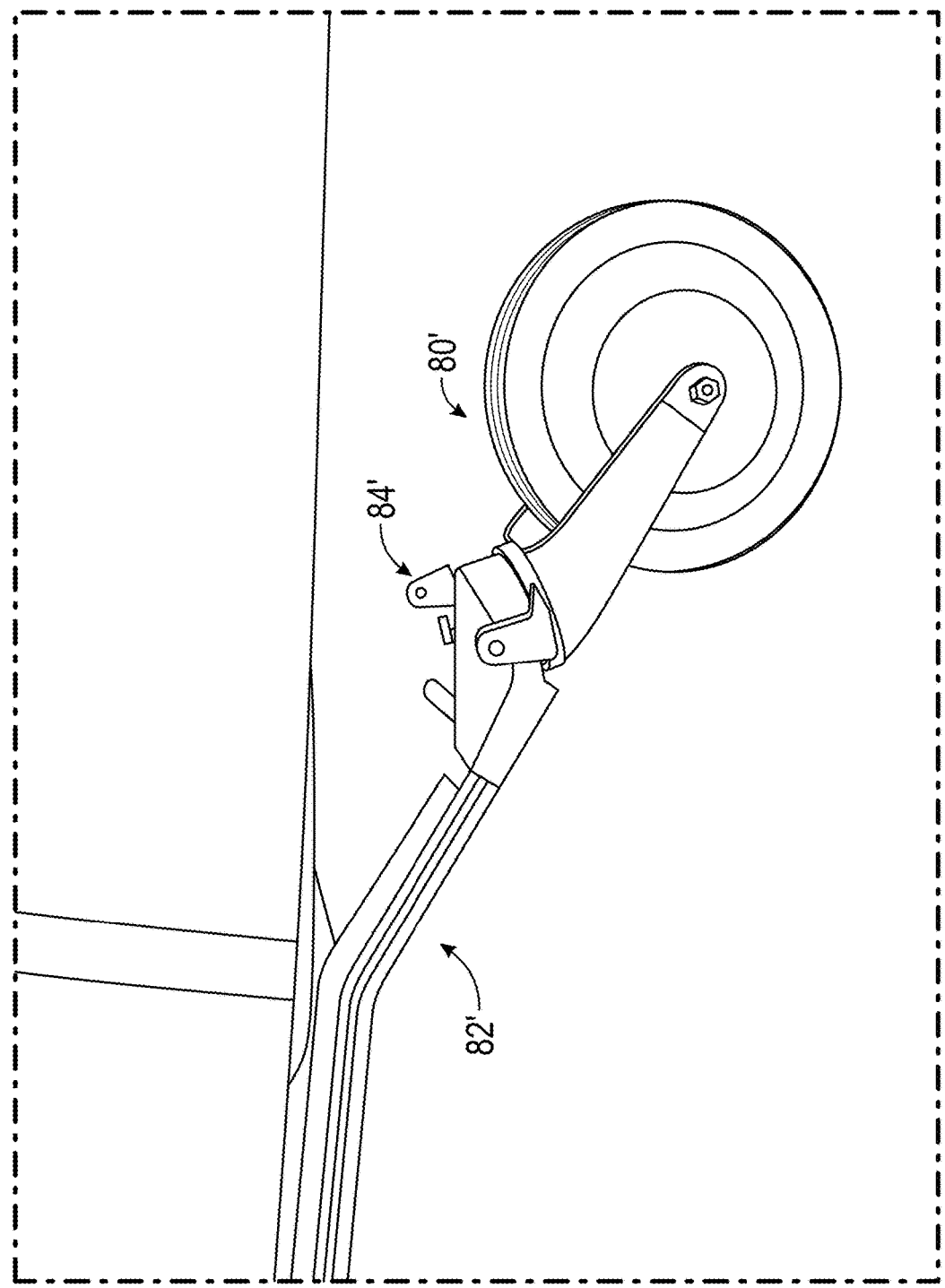
FIG. 12 is a perspective view of second exemplary prior art wheeled caster-type tail gear attached to the aircraft by a stack of bent steel.
Figure 13:
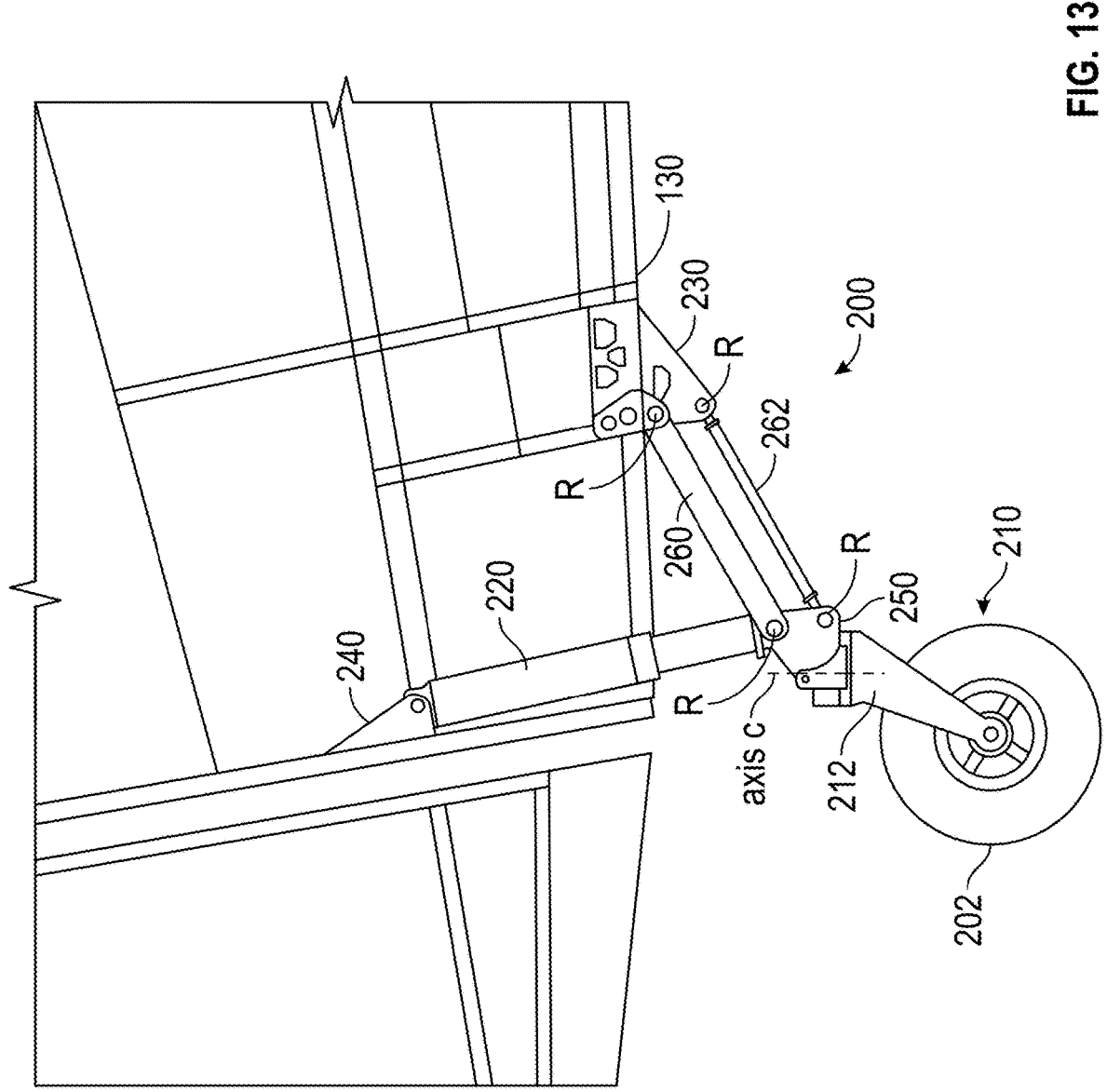
FIG. 13 is side view of a preferred exemplary constant angle suspension mechanism for use with secondary landing gear.

Constant Angle Suspension Mechanism for Secondary (Tail) Wheel Landing Gear:

As mentioned in the Background, tail wheel shimmying is a known problem of wheeled caster-type tail gear 80, 80' (referred to generally as a "secondary wheel" or "tail wheel" 80, 80' and examples of which are shown in FIGS. 11-12). A constant angle suspension landing gear system described herein includes a constant angle suspension mechanism 200 (also referred to as the "four-bar suspension linkage mechanism," "four-bar suspension linkage," and "four-bar suspension linkage secondary landing gear mechanism"). Association of a constant angle suspension mechanism 200 with secondary (tail) wheel landing gear reduces or eliminates tail wheel shimmying because, for example, the constant angle suspension mechanism 200 has a constant caster angle or pivot axis (caster steering axis or c axis shown in FIG. 13 and FIG. 19) energy absorption. The angle that is being kept substantially constant is the angle of the caster steering axis (c axis shown in FIG. 13 and FIG. 19). The constant angle suspension mechanism 200 shown in FIGS. 13-16 and described herein provides dynamic stability of the steerable tail wheel 210 (which is shown as including tire 202 and an associated steerable tail wheel fork 212) throughout the range of motion of the energy absorbing system.

Figure 14:
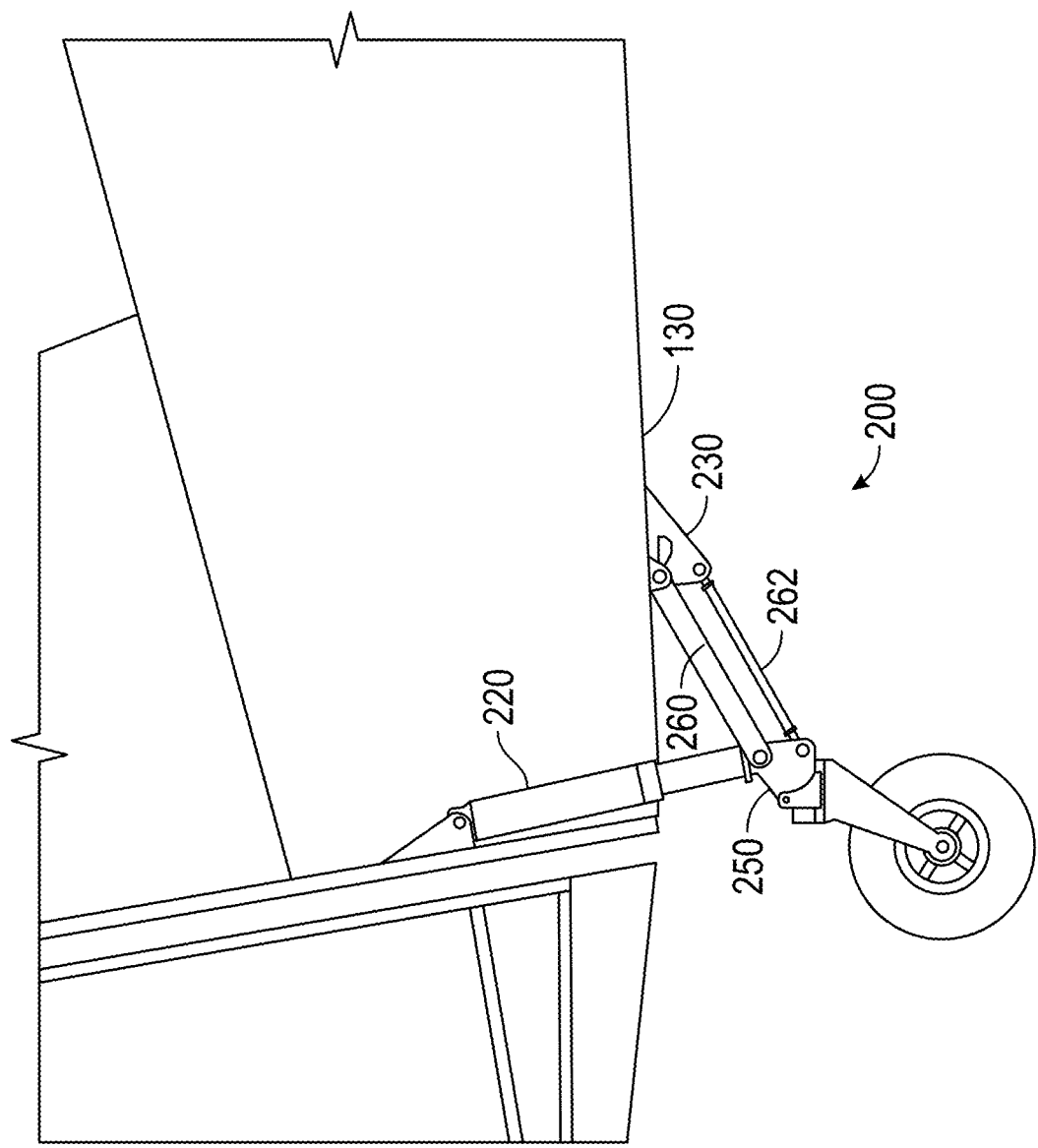
FIG. 14 is a simplified side view of a preferred exemplary constant angle suspension mechanism in the flight position (uncompressed).
Figure 15:
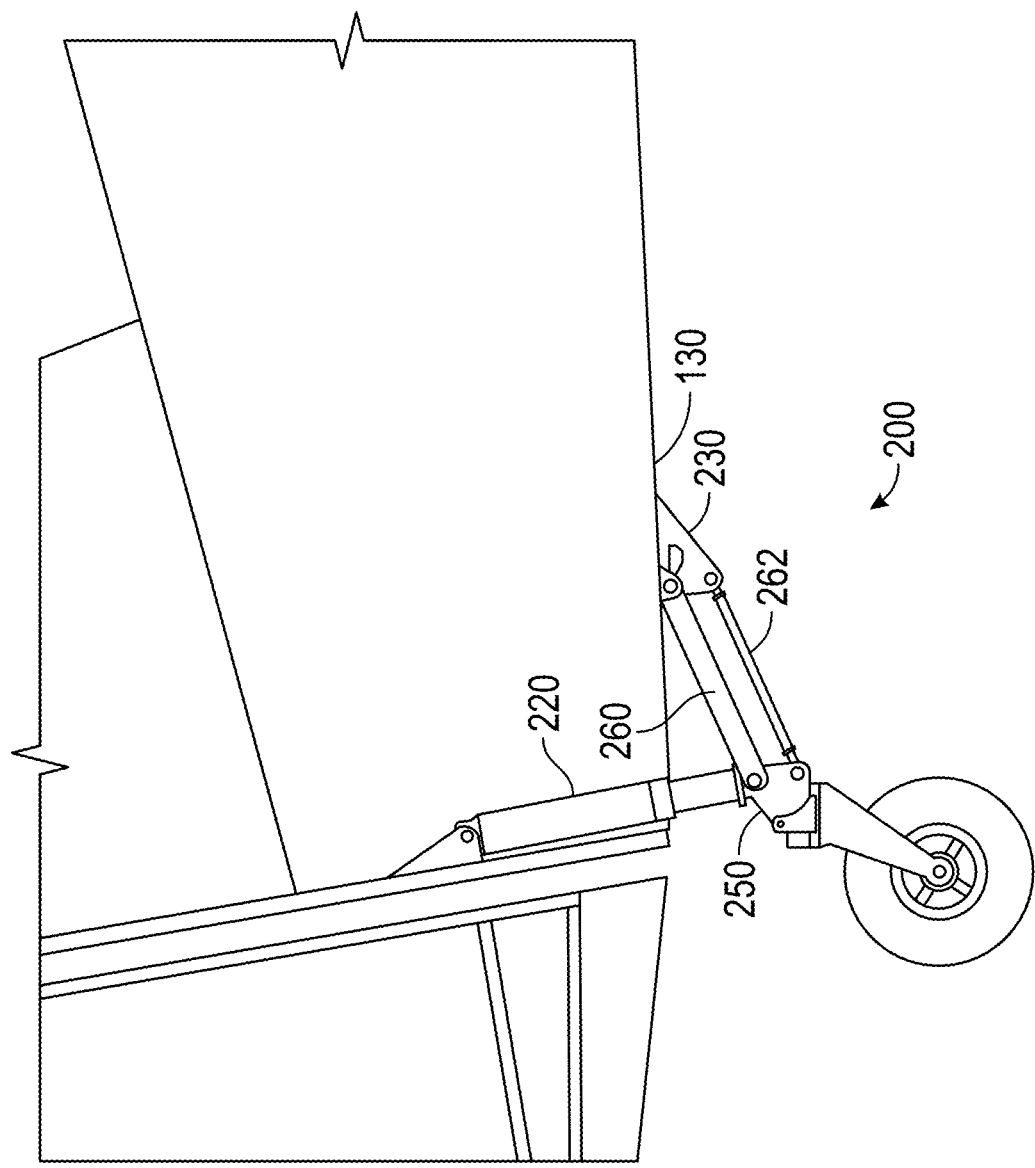
FIG. 15 is a simplified side view of a preferred exemplary constant angle suspension mechanism compressed 25%.
Figure 16:
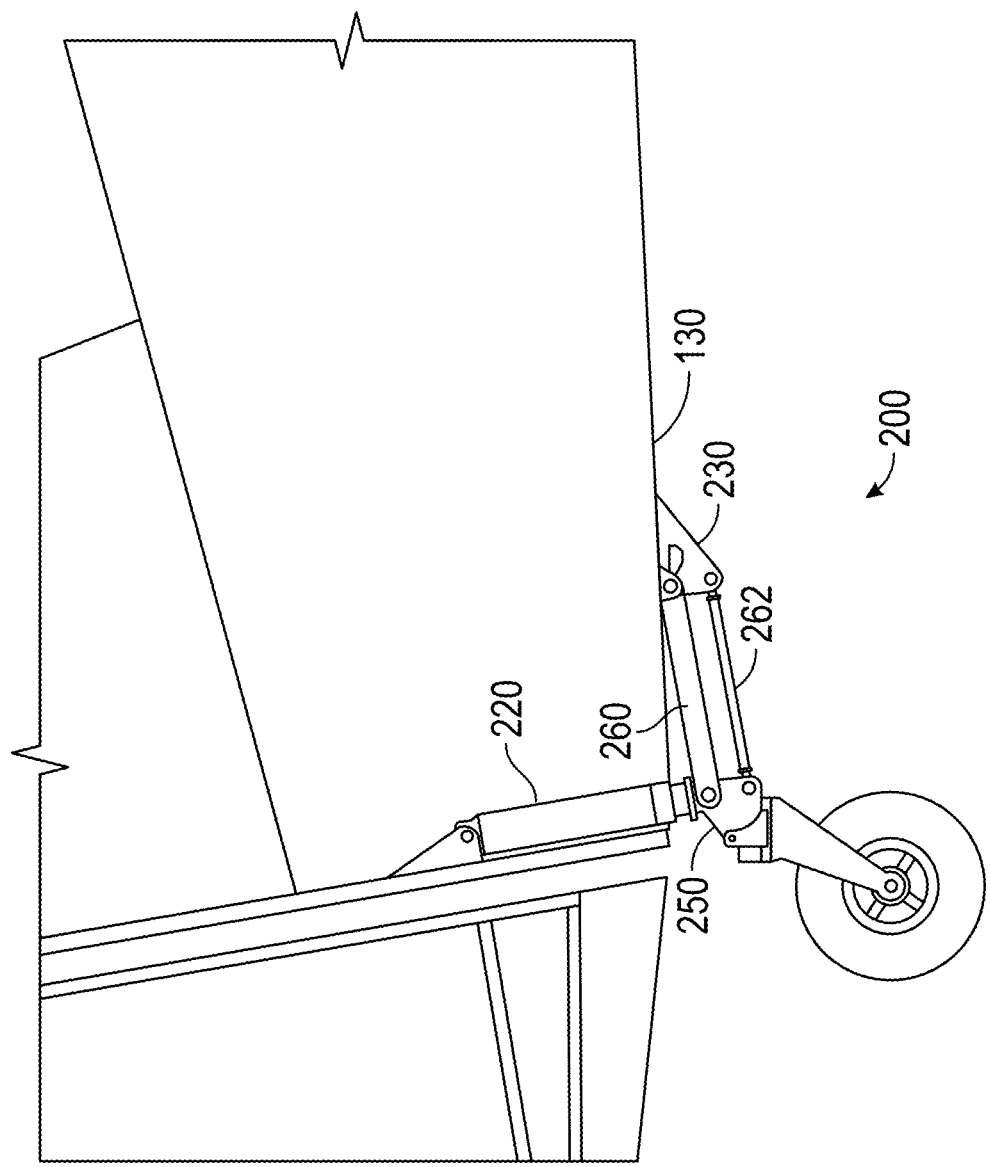
FIG. 16 is a simplified side view of a preferred exemplary constant angle suspension mechanism compressed 85%.

FIG. 14 shows the components of a preferred exemplary constant angle suspension mechanism 200 in the flight position (uncompressed 0%). FIG. 15 shows the components of the preferred exemplary constant angle suspension mechanism 200 compressed 25%. FIG. 16 shows the preferred exemplary components of the constant angle suspension mechanism 200 compressed 85%.

Figure 17:
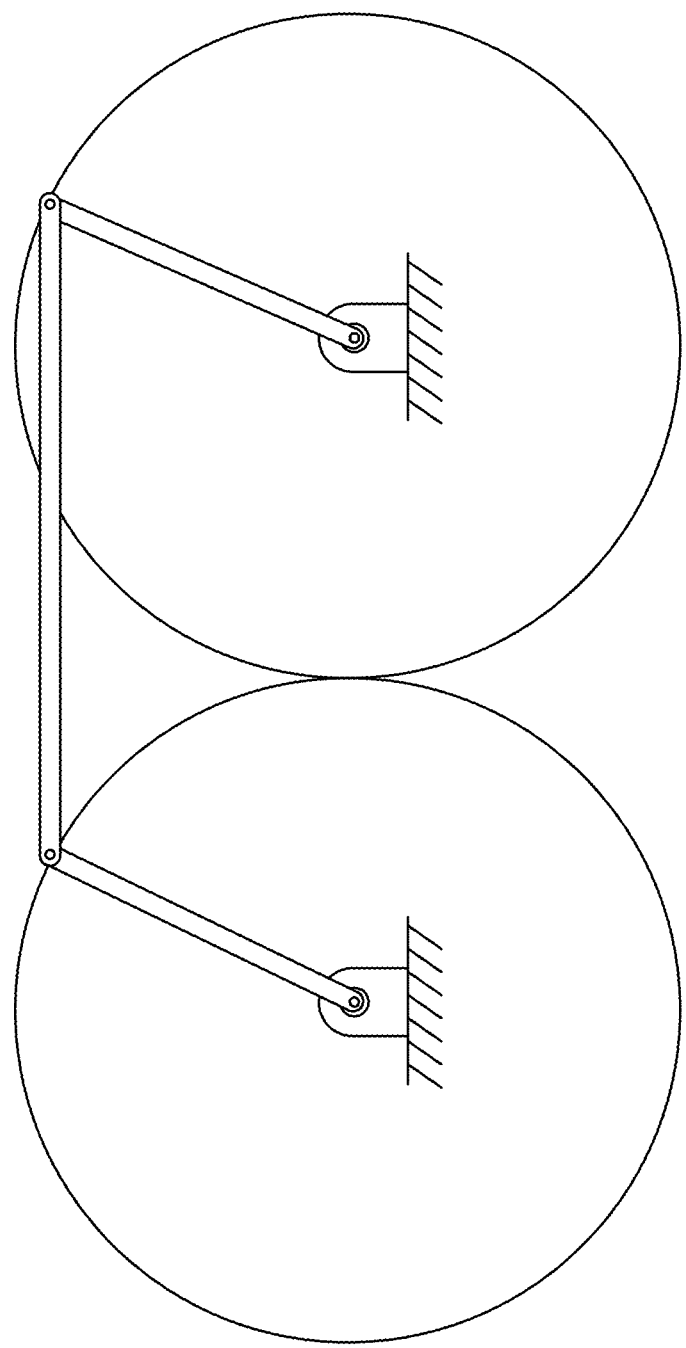
FIG. 17 is a conceptual schematic view showing the constant angle suspension mechanism represented as a parallelogram.
Figure 19:
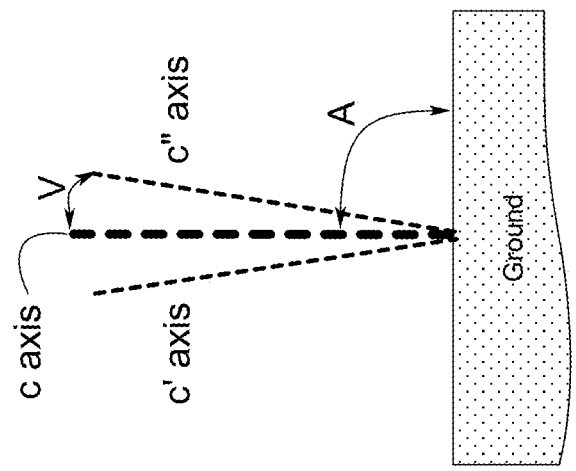
FIG. 19 is a simplified graph showing the angle relationship between pivot axis (caster steering axis or c axis) and ground.

The preferred exemplary constant angle suspension mechanism 200 can be thought of as a parallelogram as shown in FIG. 17. The shape of the parallelogram changes as the tail wheel assembly moves up into the shock absorber. The angle of the pivot axis (caster steering axis or c axis shown in FIG. 13 and FIG. 19), however, stays substantially constant (and preferably constant). FIG. 19 shows the preferred c axis having angle A in relation to ground. Angle A is "substantially constant" if it varies less than 10 degrees (angle V shows a +/−10 degree variation).

FIG. 14 details the components of the constant angle suspension mechanism 200, but these components are shown in other figures. The main components are the aircraft (or the airframe 130 thereof), a castered tire 202 (rotatable about axis c-FIG. 13 and FIG. 19), a shock absorber 220 (also referred to as a "third shock absorber," "secondary shock absorber," or "tail shock absorber"), and the constant angle suspension mechanism 200. The castered tire 202 preferably has an associated steerable tail wheel fork 212. This allows the steerable tail wheel 210 to be turned for steering during ground operations. The shock absorber 220 absorbs energy from the landing and controls the rate of motion of the tail wheel 210.

There are three mounts: a fuselage mount 230, a shock absorber mount 240, and a caster mount 250. The fuselage mount 230 mounts the suspension mechanism 200 (the constant angle suspension mechanism 200) to the aircraft with rotators (e.g. pinned joints). The shock absorber mount 240 mounts the shock absorber 220 to the aircraft with a rotator. The caster mount 250 forms a junction between the castered tire 202, the shock absorber 220, and the suspension mechanism 200.

The parallelogram of the constant angle suspension mechanism 200 is made up of at least one secondary or tail wheel control arm 260, 262 (which can be considered control arms or pinned linkages), at least one fuselage mount 230, at least one caster mount 250, and rotators R. The at least one secondary or tail wheel control arm may be at least one upper tail wheel control arm 260 (also referred to as an "upper arm") and at least one secondary or lower tail wheel control arm 262 (also referred to as an "lower arm"). (It should be noted that more or fewer arms could be used.) The arms are rigid linkages that only allow suspension movement into the shock absorber 220. Each of the arms 260, 262 has a rotator R (e.g. pinned joints) on each end: one rotator R rotatably connecting the arm 260, 262 to the fuselage mount 230, and one rotator R rotatably connecting the arm 260, 262 to the caster mount 250.

During landing, the force of the landing causes the shock absorber 220 to compress. This can be seen in the relationship between FIG. 14, FIG. 15, and FIG. 16. FIG. 14 shows the constant angle suspension mechanism 200 in its "in flight" configuration (no compression). FIG. 15 shows the constant angle suspension mechanism 200 with 25% compression. FIG. 16 shows the constant angle suspension mechanism 200 with 85% compression. The arms 260, 262 of the parallelogram of the constant angle suspension mechanism 200 stay parallel as the landing forces act upon the constant angle suspension mechanism 200. The landing forces are absorbed by the shock absorber 220.

Variations:

One variation of the aircraft landing gear described herein include includes the types of energy absorption that are used. The shown shock absorbers may be air charged shocks or alternative shock absorbing components such as coiled spring or rubber pads.

Another variation is the leverage ratios. The lengths of components can be altered to change how the system is "geared." For example, as shown, the components are designed so that 1" of shock travel allows for 1.5" of tire movement. Components could be altered (e.g. the length of the leg-to-arm linkage 106b (linkage 106b), the length of the leverage-reducing arm 106c (arm 106c), or the position of the arm-linkage rotator 110c) to suit different shock absorbers or desired tire travel. Similarly, the suspension travel could be altered (reduced or increased) by adjusting the arm, shocks, and gear leg geometry.

It should be noted that the positioning of the primary gear and/or secondary gear can be moved forward or aft to accommodate different aircraft designs (including, for example, variations in the centers of gravity G1 and G2). For example, an aircraft with a nosewheel (tricycle landing gear)

would move the primary landing gear aft multiple feet. Another example is that aircraft could have secondary landing gear closer to the center of the aircraft than to the rear 92 of the aircraft. While the primary gear and secondary gear are always on opposite sides of the center of gravity, either the primary gear or the secondary gear can be in front of the center of gravity (toward the front 90 of the aircraft) or behind the center of gravity (toward the rear 92 of the aircraft).

It should be noted that the leverage-reducing system 100 may be associated with the primary gear and/or secondary gear. Similarly, it should be noted that the constant angle suspension mechanism 200 may be associated with the primary gear and/or secondary gear. This means that the leverage-reducing system 100 may be associated with landing gear in front of the center of gravity (toward the front 90 of the aircraft) and/or behind the center of gravity (toward the rear 92 of the aircraft). Similarly, this means that the constant angle suspension mechanism 200 may be associated with landing gear in front of the center of gravity (toward the front 90 of the aircraft) and/or behind the center of gravity (toward the rear 92 of the aircraft).

It should be noted that the system may be made entirely of aluminum and steel. Further, alternative materials including, but not limited to, carbon fiber composites, titanium, magnesium may be used. The materials would have to be suitable for their intended purpose (e.g. durable, light weight, strong, and/or flexible).

It should be noted that the improvements for aircraft landing gear disclosed herein can be used together or apart. For example, the leverage-reducing system 100 can be used without the constant angle suspension mechanism 200. Similarly, the constant angle suspension mechanism 200 can be used without the leverage-reducing system 100. Finally, the leverage-reducing system 100 can be used in combination with the constant angle suspension mechanism 200.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references (including, but not limited to, publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A leverage-reducing landing gear system for an aircraft, said leverage-reducing landing gear system comprising:
    (a) said aircraft having a front, a rear, a top, a bottom, and a central vertical y-axis perpendicular to a horizontal x-axis and extending from said front to said rear, said aircraft having an airframe and landing gear, said aircraft having a center of gravity;
    (b) said landing gear including a first primary landing gear leg and a second primary landing gear leg, said first and second primary landing gear legs positioned on opposite sides of said central vertical y-axis;
    (c) at least one first shock absorber functionally connected to said first primary landing gear leg, said at least one first shock absorber connected between said first primary landing gear leg and said airframe, said at least one first shock absorber angled upward from said first primary landing gear leg toward said central vertical y-axis such that said at least one first shock absorber and said horizontal x-axis form an angle less than 30 degrees; and
    (d) at least one second shock absorber functionally connected to said second primary landing gear leg, said at least one second shock absorber connected between said second primary landing gear leg and said airframe, said at least one second shock absorber angled upward from said second primary landing gear leg toward said central vertical y-axis such that said at least one second shock absorber and said horizontal x-axis form an angle less than 30 degrees;
    (e) wherein said landing gear is fixed landing gear.

2. The leverage-reducing landing gear system of claim 1, wherein said at least one first shock absorber is angled upward from said first primary landing gear leg toward said central vertical longitudinal plane y-axis, such that said at least one first shock absorber and said horizontal x-axis form an angle less than 20 degrees, and
    wherein said at least one second shock absorber is angled upward from said second primary landing gear leg toward said vertical y-axis such that said at least one second shock absorber and said horizontal x-axis form an angle less than 20 degrees.

3. The leverage-reducing landing gear system of claim 1, wherein angling said first and second at least one shock absorbers at angles less than 30 degrees reduces drag caused by externally-mounted landing gear.

4. The leverage-reducing landing gear system of claim 1, wherein said first and second primary landing gear legs are positioned between said center of gravity and said front of aircraft.

5. The leverage-reducing landing gear system of claim 1 further comprising:
    (a) said at least one first shock absorber functionally connected to said first primary landing gear leg via a first system of segments and connectors; and (b) said at least one second shock absorber functionally connected to said second primary landing gear leg via a system of segments and connectors.

6. The leverage-reducing landing gear system of claim 1 further comprising:
   (a) said first primary landing gear leg pivotably connected to said airframe by a first leg pivot point and rotatably connected to a first leg-to-arm linkage via a first leg-linkage rotator, said first leg-to-arm linkage rotatably connected to a first leverage-reducing arm via a first arm-linkage rotator, said first leverage-reducing arm pivotably connected to said airframe via a first arm pivot point and rotatably connected to said at least one first shock absorber via a first arm shock rotator; and
   (b) said second primary landing gear leg pivotably connected to said airframe by a second leg pivot point and rotatably connected to a second leg-to-arm linkage via a second leg-linkage rotator, said second leg-to-arm linkage rotatably connected to a second leverage-reducing arm via a second arm-linkage rotator, said second leverage-reducing arm pivotably connected to said airframe via a second arm pivot point and rotatably connected to said at least one second shock absorber via a second arm-shock rotator.

7. The leverage-reducing landing gear system of claim 1, wherein the landing gear system is an energy absorbing, damped landing gear system.

8. The leverage-reducing landing gear system of claim 1, wherein said airframe defines a fuselage, wherein one end of each of said first and second primary landing gear legs are positioned within said fuselage.

9. The leverage-reducing landing gear system of claim 1, wherein said landing gear includes tires.

10. The leverage-reducing landing gear system of claim 1, wherein the leverage-reducing landing gear system is configured to be used with a constant angle suspension landing gear system comprising:
    (a) a steerable tail wheel positioned toward said rear of said aircraft and aligned with said central vertical y-axis;
    (b) at least one third shock absorber mounted between said airframe and said steerable tail wheel, said at least one third shock absorber above said steerable tail wheel; and
    (c) at least one constant angle suspension mechanism mounted between said airframe and said steerable tail wheel, said at least one constant angle suspension mechanism being more toward said front of said aircraft than said steerable tail wheel.

11. A landing-gear system for an aircraft, said landing gear system comprising:
    (a) said aircraft having a front, a rear, a top, a bottom, and a central vertical y-axis perpendicular to a horizontal x-axis and extending from said front to said rear, said aircraft having an airframe and landing gear, said aircraft having a center of gravity;
    (b) a leverage-reducing landing gear system for an aircraft, comprising:
       (i) said landing gear including a first primary landing gear leg and a second primary landing gear leg, said first and second primary landing gear legs positioned on opposite sides of said central vertical y-axis;
       (ii) at least one first shock absorber functionally connected to said first primary landing gear leg, said at least one first shock absorber connected between said first primary landing gear leg and said airframe, said at least one first shock absorber angled upward from said first primary landing gear leg toward said central vertical y-axis such that said at least one first shock absorber and said horizontal x-axis form at an angle less than 30 degrees; and
       (iii) at least one second shock absorber functionally connected to said second primary landing gear leg, said at least one second shock absorber connected between said second primary landing gear leg and said airframe, said at least one second shock absorber angled upward from said second primary landing gear leg toward said central vertical y-axis such that said at least one second shock absorber and said horizontal x-axis form an angle less than 30 degrees; and
    (c) a constant angle suspension landing gear system for an aircraft, comprising:
       (i) said landing gear including secondary landing gear including a castered tire positioned to align with said central vertical y-axis;
       (ii) at least one secondary shock absorber mounted between said airframe and said castered tire; and
       (iii) at least one constant angle suspension mechanism mounted between said airframe and said castered tire, said at least one constant angle suspension mechanism being more toward said front of said aircraft than said castered tire;
    (d) wherein said landing gear is fixed landing gear.

12. The leverage-reducing landing gear system of claim 1, wherein said landing gear is fixed landing gear.

* * * * *